United States Patent
Lundby et al.

(10) Patent No.: US 6,249,683 B1
(45) Date of Patent: Jun. 19, 2001

(54) FORWARD LINK POWER CONTROL OF MULTIPLE DATA STREAMS TRANSMITTED TO A MOBILE STATION USING A COMMON POWER CONTROL CHANNEL

(75) Inventors: Stein A. Lundby; Leonid Razoumov, both of San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/288,262

(22) Filed: Apr. 8, 1999

(51) Int. Cl.$^7$ ........................................................ H04B 7/00
(52) U.S. Cl. ............................ 455/522; 455/517; 455/419
(58) Field of Search ..................................... 455/522, 13.4, 455/69, 115, 127, 70, 68, 126, 343, 574, 561, 550, 38.3, 419; 370/318, 342, 441, 252

(56) References Cited

U.S. PATENT DOCUMENTS

| | | | |
|---|---|---|---|
| 4,495,648 | 1/1985 | Giger | 455/73 |
| 4,777,653 | 10/1988 | Bonnerot et al. | 455/69 |
| 4,811,421 | 3/1989 | Havel et al. | 455/69 |
| 4,868,795 | 9/1989 | McDavid et al. | 367/77 |
| 4,870,698 | 9/1989 | Katsuyama et al. | 455/67 |
| 4,901,307 | 2/1990 | Gilhousen et al. | 370/18 |
| 5,056,109 | 10/1991 | Gilhousen et al. | 375/1 |
| 5,093,840 | 3/1992 | Schilling | 375/1 |
| 5,204,876 | 4/1993 | Bruckert et al. | 375/1 |
| 5,257,283 | 10/1993 | Gilhousen et al. | 375/1 |
| 5,267,262 | 11/1993 | Wheatley, III | 375/1 |
| 5,396,516 | 3/1995 | Padovani et al. | 375/225 |
| 5,461,639 | 10/1995 | Wheatley, III et al. | 375/205 |
| 5,570,353 | 10/1996 | Keskitalo et al. | 370/18 |
| 5,574,983 | 11/1996 | Douzono et al. | 455/69 |
| 5,574,984 | 11/1996 | Reed et al. | 455/69 |
| 5,590,409 | 12/1996 | Sawahashi et al. | 455/69 |
| 5,604,766 | 2/1997 | Dohi et al. | 375/200 |
| 5,629,934 | 5/1997 | Ghosh et al. | 370/335 |
| 5,778,030 | 7/1998 | Bruckert et al. | 375/317 |
| 5,799,011 | * 8/1998 | LaRosa et al. | 370/335 |
| 6,035,209 | * 3/2000 | Tiedemann, Jr. et al. | 455/522 |
| 6,137,840 | * 10/2000 | Tiedemann, Jr. et al. | 455/522 |
| 6,144,841 | * 11/2000 | Feeney | 455/69 |
| 6,154,659 | * 11/2000 | Jalali et al. | 455/522 |

* cited by examiner

*Primary Examiner*—Nay Maung
*Assistant Examiner*—Sonny Trinh
(74) *Attorney, Agent, or Firm*—Philip R. Wadsworth; S. Hossain Beladi

(57) ABSTRACT

A method and apparatus for controlling transmit power levels of a plurality of different data streams transmitted from at least one base station to a mobile station in a mobile radio communication system. The first and second data streams are transmitted from the base station and received at the mobile station. A stream of power control commands is formed at the mobile station in accordance with either the first or second received data stream. A power control signal is formed at the mobile station from the first stream of power control commands and transmitted to the base station. A received stream of power control commands is formed from the received power control signal at the base station, and the transmit power levels of the first and second data streams from the base station are controlled in accordance with the received stream of power control commands. Additional streams of power control commands can also be generated at the mobile station where one or both of the first and second data streams are simultaneously transmitted to the mobile station from further base stations, and these additional streams of power control commands can be interleaved to form an interleaved power control signal that is sent to all the base stations transmitting the first and second data streams to the mobile station and used for controlling the transmit power of the first and second data streams from such base stations.

57 Claims, 21 Drawing Sheets

FORWARD LINK POWER CONTROL OF MULTIPLE DATA STREAMS TRANSMITTED TO A MOBILE STATION USING A COMMON POWER CONTROL CHANNEL

BACKGROUND OF THE INVENTION

I. Field of the Invention

This invention relates to the field of communications systems and, in particular, to a method for controlling the transmission power level of multiple data streams sent from one or several base stations to a mobile station in a mobile radio telecommunication system.

II. Prior Art

In a mobile telephone communication system, one or several base stations transmit information, such as voice information, or data, or both to a mobile station. Each base station supports one or several sectors. For example in EIA/TIA-95-A CDMA systems it is common that each base station supports three individual sectors, with each sector transmitting different information. Voice and data transmissions from a base station to one or more mobile stations typically occur on a forward link traffic channel. A mobile station receives the information from the forward link traffic channel, decodes the information, and determines a frame error rate associated with the decoded information. The frame error rate of the decoded information can be adversely affected by, for example, fading conditions in the forward link channel. Furthermore a traffic channel can be transmitted from several base stations or several sectors of the same base station. The mobile station will then combine the signals from the different sectors for improved decoding, in a process that is often referred to in the prior art as soft-handoff. The set of base station sectors transmitting the same data signal is usually named an "active set". It will be understood by those skilled by the art that the term soft handoff refers to soft handoff between different base stations as well as soft handoff between different sectors of the same base station.

In some mobile radio communication systems such as, for example, mobile radio systems that use code division multiple access (CDMA) modulation, the frame error rate at the mobile station is used to control the transmit power level sent to the mobile on the forward link traffic signal. For example, in such systems a desired ratio of signal to noise powers is derived from the desired frame error rate. An estimate of the actual signal to noise ratio received by the mobile is then used to generate a stream of power control commands that is sent from the mobile station back to the base stations in the active set. Each power control command in the stream causes the base station to either increase (by, for example, 1 dB), decrease (by, for example, 1 dB) or hold constant the transmit power sent to the mobile station on the forward link traffic channel.

Using such a power control system allows the mobile station to cause the base station to increase the transmit power to compensate for conditions such as a fade. Likewise, the power control system permits the base station to save power when the channel conditions are more favorable and a predetermined error rate can be maintained using a lower transmit power.

In modern mobile telephone communication systems, several data streams (e.g., fax transmissions, internet transmissions, voice calls etc.) can be transmitted to a mobile station concurrently. In systems such as CDMA systems, the transmission of such data streams can occur on the same forward link traffic channel (i.e., frequency channel). In such cases, each data stream (e.g., voice, fax, internet, etc.) transmitted from a particular base station to the mobile station on a given forward link is modulated using a different spreading code often called a Walsh code that permits each data stream to be separately demodulated at the mobile station. Different base stations can transmit on the forward link with the same spreading code when they utilize a different scrambling code (often called a PN code).

Where multiple data streams are transmitted from a one or several base stations to a mobile station on one or several forward links, the transmit power level of each of the data streams should be controlled as described above. However, sending a separate stream of power control commands on the reverse link from the mobile station back to each base station in order to control the transmit power of each data stream results in a substantial increase in system overhead.

Thus, it would be desirable to provide a system for forward link power control that minimized the overhead required to send power control commands from the mobile station back to a base station in cases where the base station is transmitting multiple data streams to the mobile station.

SUMMARY OF THE INVENTION

The present invention is directed to a method and apparatus for controlling transmit power levels of a first data stream transmitted from each base station in a first active set of base stations to a mobile station in a mobile radio communication system, and for controlling transmit power levels of a second data stream transmitted from each base station in a second active set of base stations to the mobile station.

In a first embodiment, a stream of power control commands is formed at the mobile station for each base station in either the first or second active set in accordance with either the first and/or second received data stream from each such base station. A power control signal is formed at the mobile station by interleaving the streams of power control commands, and the interleaved stream of power control commands is then transmitted to the base stations in the first and second active set. A received stream of power control commands is formed by deinterleaving the received power control signal at a given base station in the first and second active sets, and the transmit power levels of the first and second data streams from the given base station are both controlled in accordance with the received stream of power control commands. Thus, in this embodiment, a single stream of power control commands is used to control the transmit power levels of multiple different data streams (e.g., a voice data stream and a fax data stream) transmitted to a mobile station from a common base station.

In accordance with a further aspect of the embodiment set forth above, the second active set of base stations may be a subset of the first active set of base stations. In this case, the power control stream for each base station that is in the first active set but not in the second active set will be formed only in accordance with the first data stream from such base station.

In accordance with a still further embodiment, the present invention uses a single interleaved power control signal to transmit multiple power control command streams to each base station in both the first and second active sets, wherein each of the power control command streams is used to control the transmit power of a different data stream sent from each base station to the mobile station. In this embodiment, first and second data streams are transmitted from each base station in the first and second active sets and received at the mobile station. A stream of power control commands is formed at the mobile station in accordance with the first received data stream from each base station in the first active set, and a stream of power control commands is formed at the mobile station in accordance with the second received data stream from each base station in the second active set. A power control signal is next formed at the mobile station by interleaving the streams of power control commands, and the interleaved power control signal is transmitted from the mobile station to each base station in the first and second active sets. First and second received streams of power control commands are formed at a given base station in the first and second active sets by deinterleaving the received power control signal at the given base station. The transmit power level of the first data stream is then controlled from the given base station in accordance with the first received stream of power control commands, and the transmit power level of the second data stream is controlled from the given base station in accordance with the second received stream of power control commands.

In accordance with a further aspect of the embodiment set forth above, the second active set of base stations may be a subset of the first active set of base stations. In this case, the power control stream for each base station that is in the first active set but not in the second active set will be formed only in accordance with the first data stream from such base station.

In accordance with a still further aspect, the signal strength measurements of two corresponding data streams transmitted to a mobile station from first and second base stations are examined in order to determine the power control commands used for controlling the transmit power of one (or both) of the two corresponding data streams transmitted from the two base stations. This aspect of the invention thus uses information about the signal strength of a data stream transmitted to a mobile station from a first base station for generating power control commands used for controlling the transmit power of a corresponding data stream transmitted to the mobile station from a second (different) base station. A first data stream is transmitted from first and second base stations to the mobile station, and a second data stream is transmitted from the first base station to the mobile station. In this embodiment, the transmit power level of the first data stream from the first base station is then controlled at the mobile station by monitoring the signal quality of the first data stream received from the first base station as well as the signal quality of the first data stream received from the second base station. Similarly, the transmit power level of the first data stream from the second base station is controlled at the mobile station by monitoring the signal quality of the first data stream received from the second base station as well as the signal quality of the first data stream received from the first base station.

In accordance with yet a still further aspect, the signal strength measurements of two corresponding data streams transmitted to a mobile station from first and second base stations are examined in order to determine the power control commands used for controlling the transmit power of one (or both) of the two corresponding data streams transmitted from the two base stations. This aspect of the invention thus also uses information about the signal strength of a data stream transmitted to a mobile station from a first base station for generating power control commands used for controlling the transmit power of a corresponding data stream transmitted to the mobile station from a second (different) base station. A first data stream is transmitted from first and second base stations to the mobile station, and a second data stream is transmitted from the first base station to the mobile station. In this embodiment, the transmit power level of the first data stream from the second base station is then controlled at the mobile station by monitoring the signal quality of the first data stream received from the first base station as well as the signal quality of the first data stream received from the second base station. The transmit power levels of the first and second data streams from the first base station are controlled at the mobile station by monitoring the signal quality of the second data stream received from the first base station.

The aspects of the invention discussed in the two paragraphs immediately above can be generalized such that the system uses different signal strengths from corresponding data streams transmitted to a mobile station from a first active set of base stations for generating power control commands used for controlling the transmit power of the corresponding data streams transmitted to the mobile station from each base station in the first active set. In this more general embodiment, the first data stream is transmitted from base stations in the first active set to the mobile station, and a second data stream is transmitted from base station(s) in a second active set of one or more base stations to the mobile station. A first set of power control command streams is then formed at the mobile station and transmitted to the base stations in the first active set, wherein each stream of power control commands in the set is determined in accordance with the first data streams received from all base stations in the first active set of base stations. The first and second base stations discussed in the two paragraphs immediately above would be included in the first active set of base stations, the second base station would be included in the second active set of base stations, and the second active set of base stations may or may not be a subset of the first active set of base stations.

In a further alternate embodiment, the first stream of power control commands is formed at the mobile station in accordance with the first and second data streams received at the mobile station only from the base stations in the second active set. The second stream of power control commands is formed at the mobile station in accordance with the first data streams or second data streams or both data streams received at the mobile station from the base stations in the first active set but not in the second active set. The mobile station then forms an interleaved power control signal by interleaving the first and second streams of power control commands, and the interleaved power control signal is transmitted from the mobile station on the reverse link. The interleaved power control signal is received at both the base stations in the first and second active sets. The base stations form a first received stream of power control commands by deinterleaving the received interleaved power control signal, and a second received stream of power control commands by deinterleaving the received interleaved power control signal. The transmit power level of the first and second data streams transmitted by the base stations in the second active set is then controlled in accordance with the first received stream of power control commands, and the transmit power level of the first data stream transmitted by the base stations in the first active set but not in the second active set is controlled in accordance with the second received stream of power control commands.

In accordance with a still further embodiment where the communication system includes first and second active sets, the first data stream is transmitted from the base stations in the first active set to the mobile station, and the second data stream is transmitted from the base stations in the second active set to the mobile station. In this embodiment, the second active set is a subset of the first active set. A first stream of power control commands is formed at the mobile station in accordance with the first data stream received at the mobile station from the base stations in the first active set. A second stream of power control commands is formed at the mobile station in accordance with the first data stream or second data stream or both data streams received at the mobile station from the base stations in the second active set. The mobile station then forms an interleaved power control signal by interleaving the first and second streams of power control commands, and the interleaved power control signal is transmitted from the mobile station to all the base stations in both active sets. The interleaved power control signal is received at base stations in both the first and second active sets. The base stations form a first received stream of power control commands by de-interleaving the received interleaved power control signal, and a second received stream of power control commands by de-interleaving the received interleaved power control signal. The transmit power level of the first and second data streams transmitted by the base stations that are in the second active set is controlled by using the commands of the first stream or a combination of both streams of power control commands. The transmit power level of the first data stream transmitted by the base stations that are in the first active set but not in the second active set is controlled in accordance with the first received stream of power control commands or a combination of the first and second received streams of power control commands.

This previous embodiment is particularly useful when the second stream of data is intermittent and only transmitted from a subset of the base stations in the first active set.

In a further embodiment where the radio telephone communication system includes different first and second active sets, the first data stream is transmitted from the base stations in the first active set to the mobile station and the second data stream is transmitted from the base stations in the second active set to the mobile station. A single stream of power control commands is then formed at the mobile station in accordance with the first data stream received from the base stations in the first active set. The mobile station then forms a power control signal with the power control commands, and the power control signal is transmitted from the mobile station to all the base stations in both active sets. The power control signal is received at base stations in both the first and second active sets. The base stations in the first active set and the base stations in the second active set form a received stream of power control commands by decoding the received power control signal. The transmit power level of the first data stream transmitted by the base stations in the first active set and the transmit power level of the second data stream transmitted by the base stations in the second active set is then controlled in accordance with the received stream of power control commands. The difference in transmitted power between the first and second data stream is adjusted by means of a separate mechanism. For example a message sent time to time from the mobile station to the base stations or an outer loop based on the QoS currently measured and the desired QoS of the second data stream after decoding by the mobile station. This QoS could be a frame error rate or other.

In an alternate embodiment of the previous embodiment, the power control commands are generated based on both the first and second data streams received at the mobile station.

In the above embodiments, the mobile station preferably forms each stream of power control commands by monitoring either a frame error rate or a signal-to-noise ratio associated with a given received data stream. Furthermore, the first and second streams of power control commands are preferably generated in accordance with an interleaving pattern, and the commands from each stream are only generated and inserted when required by the interleaving pattern. This ensures that no excess commands are generated whose transmission would delay newer commands. This also ensures that the interleaving process will not delay unnecessarily the power control commands from one stream or another.

BRIEF DESCRIPTION OF THE DRAWINGS

The features, objects, and advantages of the present invention will become more apparent from the detailed description set forth below when taken in conjunction with the drawings in which like reference characters identify corresponding elements throughout and wherein:

In FIG. 1B, the mobile radio station receives a plurality of different data streams from at least one base station, and only a single data stream from at least one base station.

In FIG. 1D, the mobile radio station receives a plurality of different data streams from at least one base station, and only a single data stream from at least one base station.

FIG. 1I shows a further alternate embodiment of the mobile radio station of the present invention. In this embodiment, a coarse power control command stream is generated from the first data stream from each base station in the first active set and the second data stream from each base station in the second active set, and then used for controlling the transmit power level of the first data stream from each base station in the first active set and the transmit power level of the second data stream from each base station in the second active set. A fine power control stream is also generated and used in combination with the coarse power control command stream for adjusting the transmit power level of the second data stream from each base station in the second active set that is also in the first active set.

In FIG. 2B, the base station transmits a plurality of different data streams to at least one mobile station, and only a single data stream to other mobile stations on the base station's forward link.

In FIG. 2D, the base station transmits a plurality of different data streams to at least one mobile station, and only a single data stream to other mobile stations on the base station's forward link.

DETAILED DESCRIPTION OF THE INVENTION

Figure 1A:
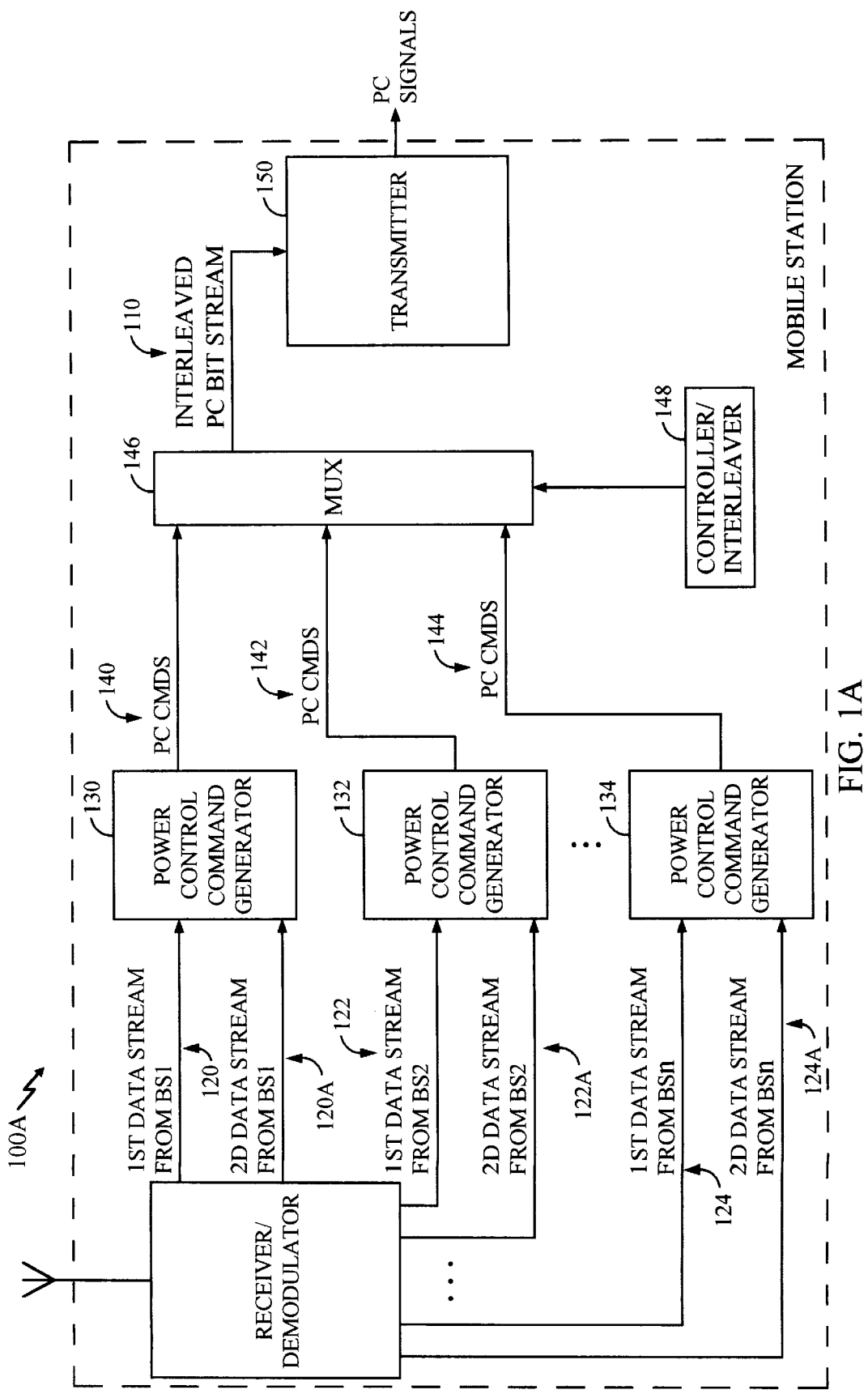
FIG. 1A shows a mobile radio station that generates an interleaved power control signal for controlling the transmit power levels of a plurality of different data streams transmitted to the mobile station from one or more base stations, in accordance with a preferred embodiment of the present invention. In the embodiment of FIG. 1A, the transmit power levels of different data streams transmitted to the mobile station from the same base station are controlled using a common stream of power control commands included in the interleaved power control signal.

FIG. 1A shows a mobile radio station 100a that generates an interleaved power control bit stream 110 for controlling the transmit power levels of a plurality of different data streams 120, 120a, 122, 122a, 124, 124a that are transmitted to the mobile radio station from one or more base stations. Data streams 120, 122, . . . 124, carry the same information (e.g., the same voice transmission) and are transmitted from a first active set of base stations (i.e., BS1, BS2, . . . BSn). Data streams 120a, 122a, . . . 124a, carry the same information (e.g., the same internet or fax transmission) and are simulataneously transmitted from a second active set of base stations (i.e., BS1, BS2, . . . BSn). As explained more fully below in connection with various alternative embodiments, the second active set of base stations may or may not be a subset of the first active set. Data streams 120, 120a, 122, 122a, 124, 124a are transmitted to the mobile radio station on, for example, a common frequency band using code division multiple access (CDMA) or time division multiple access (TDMA) modulation. Multiple data streams from different base stations are used to transmit multiple representations of the same information to the mobile radio station when, for example, the mobile radio station is in a soft handoff between two or more base stations or in cases where diversity signals are used to achieve better reception at the mobile station. The transmission of multiple versions of the same data signal to a given mobile station from different base stations to perform a soft handoff or to achieve transmit diversity is well known in the art.

In mobile station 100a, the data streams 120, 120a received from BS1 are provided to a power control command generator 130 which generates a single stream of power control commands from the received data streams. In the embodiment of FIG. 1A, power control command generator 130 optionally selects either data stream 120 or data stream 120a (or a combination thereof) to monitor. Thereafter, the power control command generator 130 monitors either the received signal-to-noise ratio or the frame error rate associated with the selected data stream (or the sum of the received signal-to-noise ratio or the frame error rate associated with both data streams 120, 120a if the combination is being monitored), and generates a series of forward link power control commands 140 based on this information. Each power control command in stream 140 will, for example, represent a command to BS1 indicating that BS1 should either increase or decrease the transmit power level used to transmit subsequent frames of data streams 120, 120a to mobile radio station 100a. Deriving such a stream of power control commands using either the received signal-to-noise ratio or the frame error rate of a single received signal is well known in the art. Where a combination of data streams 120, 120a is being monitored, the sum of the received signal-to-noise ratios associated with each data stream is preferably compared to a threshold representing a desired sum of signal-to-noise ratios expected from the combination of data streams 120, 120a in order to generate the stream of power control commands. In the embodiment of FIG. 1A, a single, common stream of power control commands 140 is thus generated for both data streams 120, 120a using either one of the two data streams or both streams. This aspect of the invention recognizes that when multiple data streams are transmitted on a forward link traffic channel from a base station to a given mobile station, fading conditions in the traffic channel will likely impact all data streams transmitted from the base station to the mobile station in a similar manner and thus a single (or common) stream of power control commands can be used to control the transmit power of all data streams transmitted to the given mobile station from the base station.

Referring still to FIG. 1A, the data streams 122, 122a received from BS2 are provided to a power control command generator 132 which generates a single stream of power control commands from the received data streams. In the embodiment of FIG. 1A, power control command generator 132 optionally selects either data stream 122 or data stream 122a (or a combination thereof) to monitor. Thereafter, the power control command generator 132 monitors either the received signal-to-noise ratio or the frame error rate associated with the selected data stream (or the sum of the received signal-to-noise ratio or the frame error rate associated with both data streams 122, 122a if the combination is being monitored), and generates a series of forward link power control commands 142 based on this information. Each power control command in stream 142 will, for example, represent a command to the BS2 indicating that the BS2 should either increase or decrease the transmit power level used to transmit subsequent frames of data streams 122, 122a to mobile radio station 100. Again, deriving such a stream of power control commands using either the received signal-to-noise ratio or the frame error rate of a single received signal is well known in the art. Where a combination of data streams 122, 122a is being monitored, the sum of the received signal-to-noise ratios associated with each data stream is preferably compared to a threshold representing a desired sum of signal-to-noise ratios expected from the combination of data streams 122, 122a in order to generate the stream of power control commands. In the embodiment of FIG. 1A, a single, common stream of power control commands 142 is generated for both data streams 122, 122a using either one of the two data streams or both streams.

The data streams 124, 124a received from BSn are provided to a power control command generator 134 which generates a single stream of power control commands from the received data streams. In the embodiment of FIG. 1A, power control command generator 134 optionally selects either data stream 124 or data stream 124a (or a combination thereof) to monitor. Thereafter, the power control command generator 134 monitors either the received signal-to-noise ratio or the frame error rate associated with the selected data stream(or the sum of the received signal-to-noise ratio or the frame error rate associated with both data streams 124, 124a if the combination is being monitored), and generates a series of forward link power control commands 144 based on this information. Each power control command in stream 144 will, for example, represent a command to the BSn indicating that the BSn should either increase or decrease the transmit power level used to transmit subsequent frames of data streams 124, 124a to mobile radio station 100. Again, deriving such a stream of power control commands using either the received signal-to-noise ratio or the frame error rate of a single received signal is well known in the art. Where a combination of data streams 124, 124a is being monitored, the sum of the received signal-to-noise ratios associated with each data stream is preferably compared to a threshold representing a desired sum of signal-to-noise ratios expected from the combination of data streams 124, 124a in order to generate the stream of power control commands. In the embodiment of FIG. 1A, a single, common stream of power control commands 144 is generated for both data streams 124, 124a using either one of the two data streams or both streams.

Although data streams from three base stations are shown as being received by mobile station 100a, it will be understood by those skilled in the art that mobile station 100 could be configured to receive data signals from more than (or less than) three different base stations.

The power control command streams 140, 142, 144 are provided to a mutliplexer 146 which is controlled by an interleaver controller 148. The mutliplexer 146 merges the separate power control command streams 140, 142, 144 into a single interleaved power control bit stream 110. A transmitter 150 transmits the interleaved power control bit stream 110 back to the base stations (BS1, BS2 . . . BSn) on a power control channel or subchannel.

In a preferred embodiment of the present invention, each base station in a first set of active base stations simultaneously transmits a version of a first data stream (e.g., signals 120, 122 and 124 in FIG. 1A) to mobile station 100, and each base station in a second set of active base stations simultaneously transmits a version of a second data stream (e.g., signals 120a, 122a and 124a) to mobile station 100. The base stations in each active set are preferably maintained by monitoring pilot signals from base stations in the vicinity of the mobile station 100, and then adding or deleting a base station from the active set as the pilot signal from the base station either rises above or falls below a threshold. Using pilot signals from base stations for maintaining an active set of base stations is well known in the art. In the preferred embodiment, the sets of active base stations need not be identical; however, one of the sets of active base stations (e.g., the second set) will typically be a subset of the other set of active base stations (e.g., the first set). As set forth below, in some embodiments of the invention, the second active set of base stations will not be a subset of the first active set.

Figure 1B:
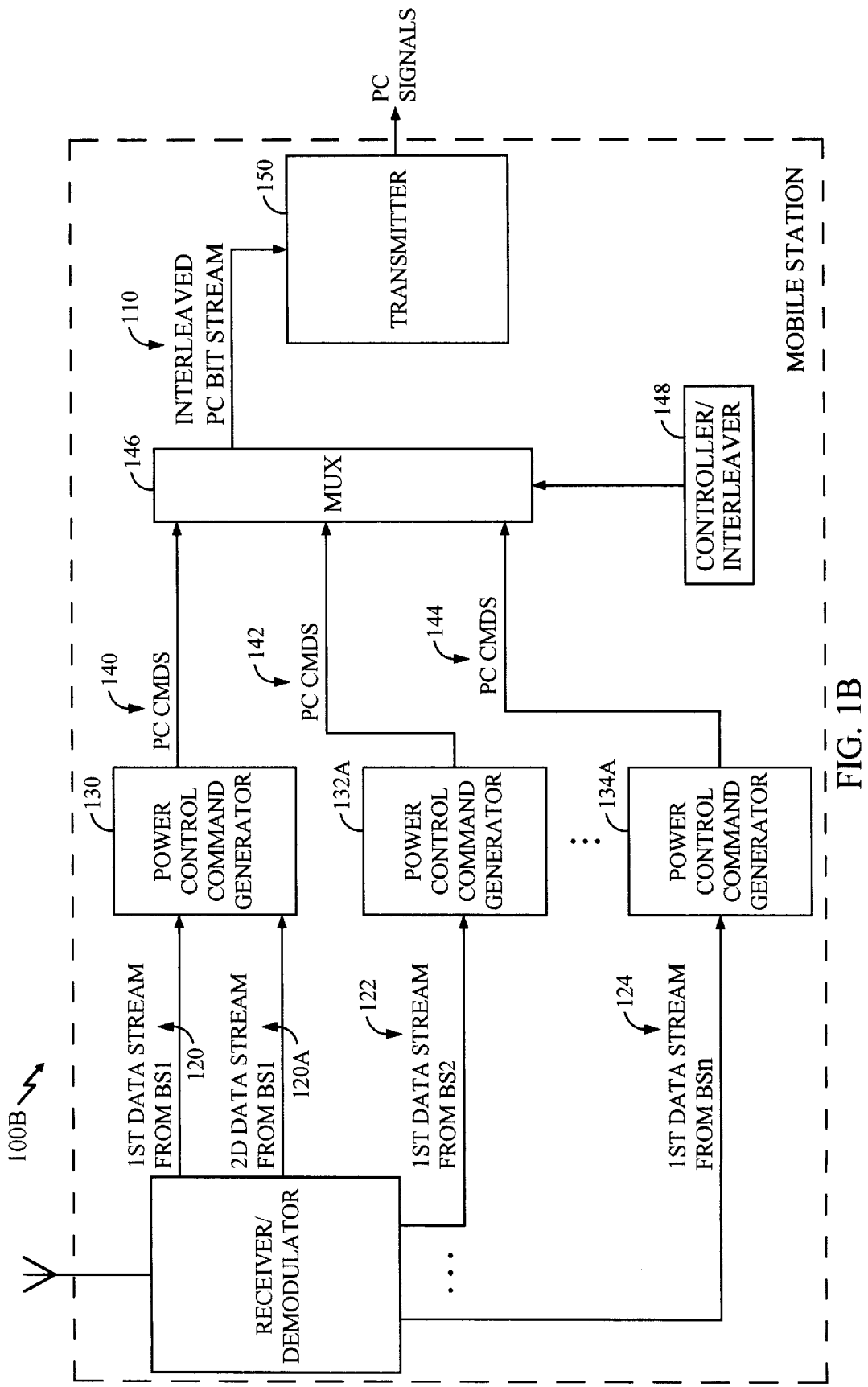
FIG. 1B shows an alternate preferred embodiment of the mobile radio station of FIG. 1A.

In FIG. 1A, the first set of active base stations used to simultaneously transmit versions of the first data stream (e.g., signals 120, 122 and 124 in FIG. 1A) to the mobile station was identical to the second set of active base stations used to simultaneously transmit versions of the second data stream (e.g., signals 120a, 122a and 124a) to the mobile station. FIG. 1B shows an alternate preferred embodiment of the mobile radio station of FIG. 1A where different sets of active base stations are transmitting the different data streams to the mobile radio station. In FIG. 1B, mobile radio station 100b is receiving different data streams 120, 120a from BS1, only a single data stream 122 from BS2 and only a single data stream 124 from BSn. Thus, in FIG. 1B, a first active set of base stations (i.e., BS1, BS2 and BSn) simultaneously transmit versions of a first data stream (i.e., signals 120, 122 and 124 in FIG. 1B) to mobile station 100b, and a second set of active base stations formed only of BS1 transmits a second data stream (i.e., signal 120) to mobile station 100a. The active sets of base stations used for transmitting the data streams to the mobile station may not be identical as shown in FIG. 1B when, for example, the mobile station is in a soft handoff between different base stations in the active sets. In the embodiment shown in FIG. 1B, power control command generators 132a, 134a, respectively monitor data streams 122, 124 in order to generate power control command streams 142, 144 as described above.

Figure 1C:
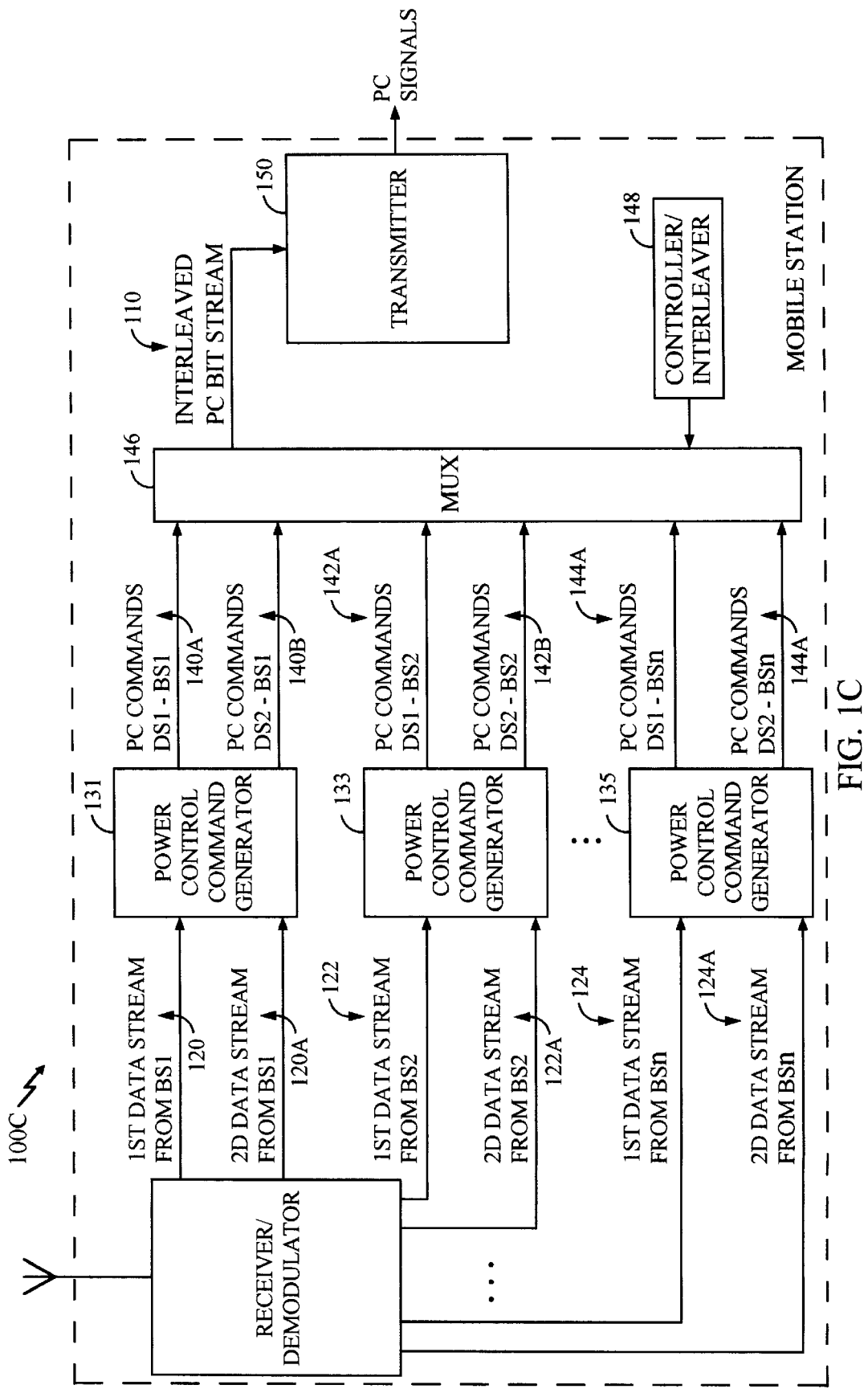
FIG. 1C shows a mobile radio station that generates an interleaved power control signal for controlling the transmit power levels of a plurality of different data streams transmitted to the mobile station from one or more base stations, in accordance with an alternate preferred embodiment of the present invention. In the embodiment of FIG. 1C, the transmit power levels of different data streams transmitted to the mobile station from the same base station are controlled using different streams of power control commands included in the interleaved power control signal.

FIG. 1C shows a mobile radio station 100c that generates an interleaved power control signal 110 for controlling the transmit power levels of a plurality of different data streams transmitted to the mobile station from one or more base stations, in accordance with an alternate preferred embodiment of the present invention. In contrast to the embodiments of FIGS. 1A and 1B, in the embodiment of FIG. 1C, the transmit power levels of different data streams transmitted to the mobile station from the same base station are controlled using different streams of power control commands included in the interleaved power control signal.

Thus, in mobile station 100c, the data streams 120, 120a received from BS1 are provided to a power control command generator 131 which generates a different stream of power control commands for each of the received data streams. Power control command generator 131 monitors the received signal-to-noise ratio or the frame error rate associated with data stream 120, and generates a series of forward link power control commands 140a based on this information. Power control command generator 131 also separately monitors the received signal-to-noise ratio or the frame error rate associated with data stream 120a, and generates a separate series of forward link power control commands 140b based on this information. Each power control command in stream 140a or 140b will, for example, represent a command to the BS1 indicating that the BS1 should either increase or decrease the transmit power level used to transmit subsequent frames of data streams 120, 120a to mobile radio station 100. Deriving such a stream of power control commands using either the received signal-to-noise ratio or the frame error rate of a received signal is well known in the art.

Referring still to FIG. 1C, the data streams 122, 122a received from BS2 are provided to a power control command generator 133 which generates a different stream of power control commands for each of the received data streams. Power control command generator 133 monitors the received signal-to-noise ratio or the frame error rate associated with data stream 122, and generates a series of forward link power control commands 142a based on this information. Power control command generator 133 also separately monitors the received signal-to-noise ratio or the frame error rate associated with data stream 122a, and generates a separate series of forward link power control commands 142b based on this information. Each power control command in stream 142a or 142b will, for example, represent a command to the BS2 indicating that the BS2 should either increase or decrease the transmit power level used to transmit subsequent frames of data streams 122, 122a to mobile radio station 100.

The data streams 124, 124a received from BSn are provided to a power control command generator 135 which generates a different stream of power control commands for each of the received data streams. Power control command generator 135 monitors the received signal-to-noise ratio or the frame error rate associated with data stream 124, and generates a series of forward link power control commands 144*a* based on this information. Power control command generator 135 also separately monitors the received signal-to-noise ratio or the frame error rate associated with data stream 124*a*, and generates a separate series of forward link power control commands 144*b* based on this information. Each power control command in stream 144*a* or 144*b* will, for example, represent a command to the BSn indicating that the BSn should either increase or decrease the transmit power level used to transmit subsequent frames of data streams 124, 124*a* to mobile radio station 100.

Although data streams from three base stations are shown as being received by mobile station 100*c*, it will be understood by those skilled in the art that mobile station 100*c* could be configured to receive data signals from more than (or less than) three different base stations.

The power control command streams 140*a*, 140*b*, 142*a*, 142*b*, 144*a*, 144*b* are provided to a mutliplexer 146 which is controlled by an interleaver controller 148. The mutliplexer 146 merges the separate power control command streams 140*a*, 140*b*, 142*a*, 142*b*, 144*a*, 144*b* into a single interleaved power control bit stream 110. A transmitter 150 transmits the interleaved power control bit stream 110 back to the base stations (BS1, BS2 ... BSn) on a power control channel or subchannel.

Figure 1D:
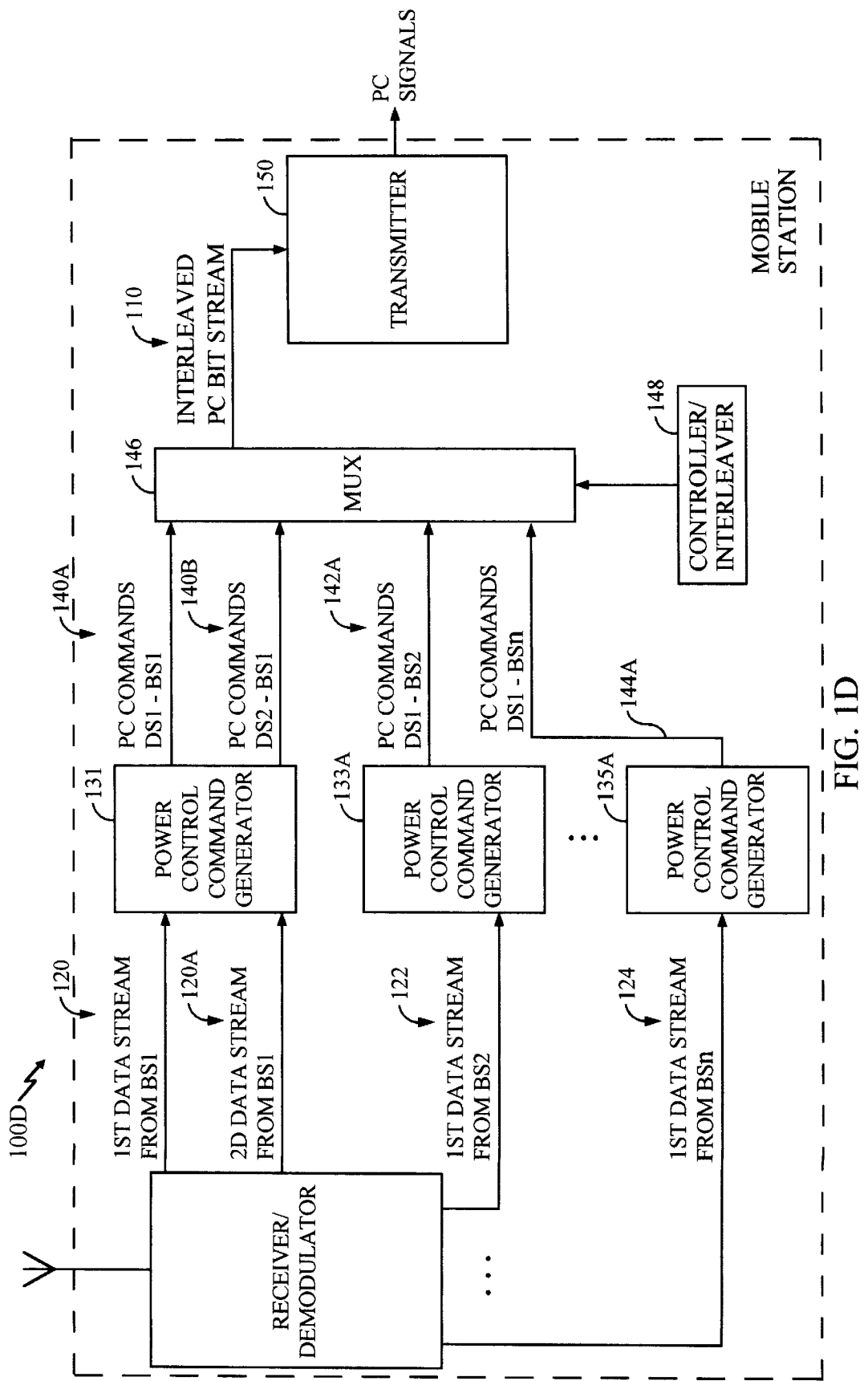
FIG. 1D shows an alternate preferred embodiment of the mobile radio station of FIG. 1C.

In FIG. 1C, the first set of active base stations used to simultaneously transmit versions of the first data stream (e.g., signals 120, 122 and 124 in FIG. 1C) to the mobile station was identical to the second set of active base stations used to simultaneously transmit versions of the second data stream (e.g., signals 120*a*, 122*a* and 124*a*) to the mobile station. FIG. 1D shows an alternate preferred embodiment of the mobile radio station of FIG. 1C where different sets of active base stations are transmitting the different data streams to the mobile radio station. In FIG. 1D, mobile radio station 100*d* is receiving different data streams 120, 120*a* from BS1, only a single data stream 122 from BS2 and only a single data stream 124 from BSn. Thus, in FIG. 1D, a first active set of base stations (i.e., BS1, BS2 and BSn) simultaneously transmit versions of a first data stream (i.e., signals 120, 122 and 124 in FIG. 1D) to mobile station 100*d*, and a second set of active base stations formed only of BS1 transmits a second data stream (i.e., signal 120) to mobile station 100*d*. The active sets of base stations used for transmitting the data streams to the mobile station may not be identical as shown in FIG. 1D when, for example, the mobile station is in a soft handoff between different base stations in the active sets. In the embodiment shown in FIG. 1D, power control command generators 133*a*, 135*a*, respectively monitor data streams 122, 124 in order to generate power control command streams 142*a*, 144*a* as described above.

Figure 1E:
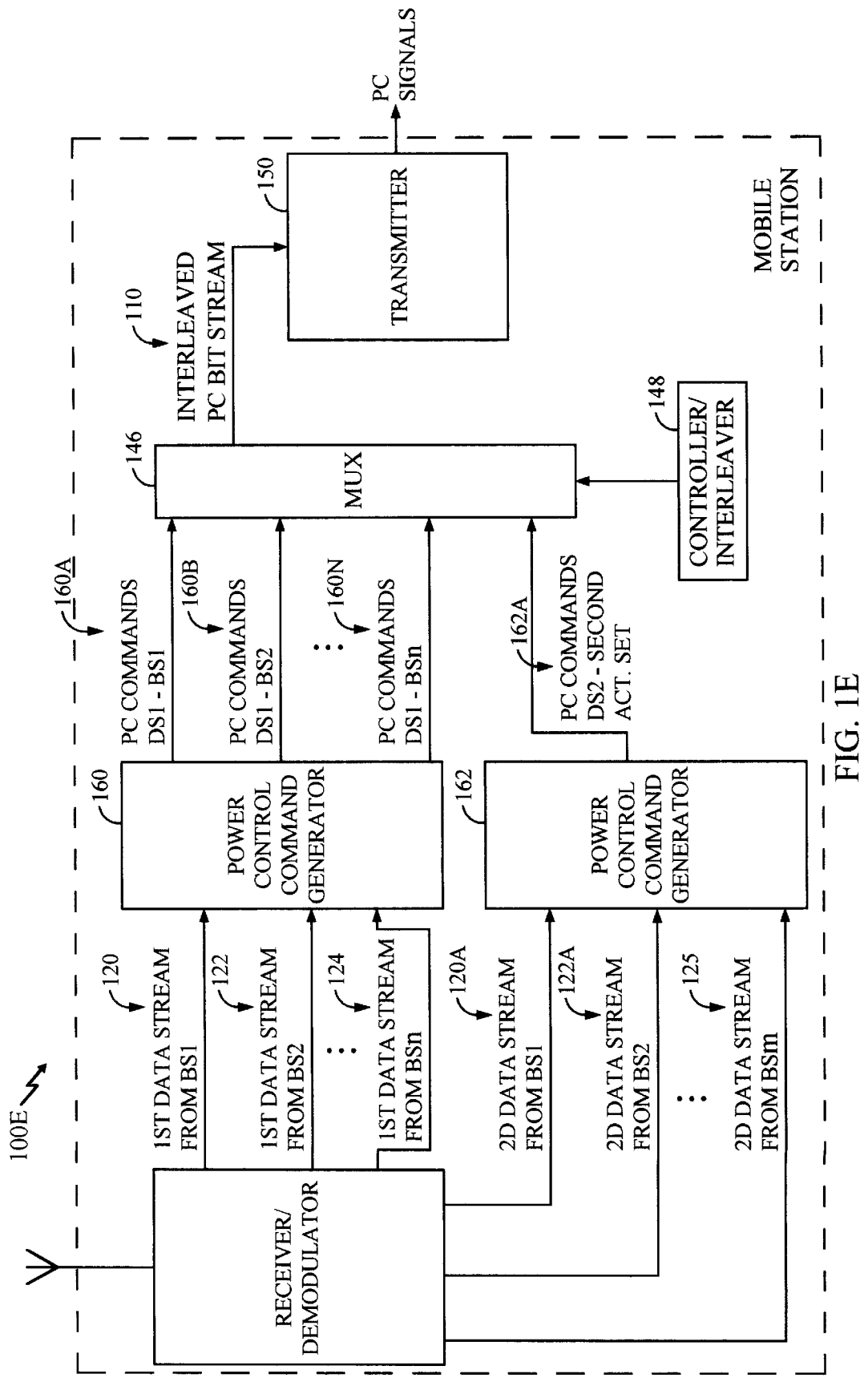
FIG. 1E shows an alternate embodiment of the mobile radio station of the present invention. In this embodiment, a first data stream is transmitted to the mobile station from at least first and second base stations. The transmit power level of the first data stream from the first base station is then controlled at the mobile station by monitoring the signal quality of the first data stream received from the first base station as well as the signal quality of the first data stream received from the second base station. Similarly, the transmit power level of the first data stream from the second base station is controlled at the mobile station by monitoring the signal quality of the first data stream received from the second base station as well as the signal quality of the first data stream received from the first base station.

FIG. 1E shows a mobile radio station 100*e* that forms an interleaved power control bit stream in accordance with an alternate embodiment of the present invention. In this embodiment, a first set of active base stations (BS1, BS2, ... BSn) simultaneously transmit versions of the first data stream (e.g., signals 120, 122 and 124) to the mobile station 100*e*, and a second set of active base stations (BS1, BS2, ... BSm) simultaneously transmit versions of the second data stream (e.g., signals 120*a*, 122*a* and 125) to the mobile station 100*e*. Power control command generator 160 generates a separate stream of power control commands for controlling the first data stream from each base station in the first active set. Thus, power control command stream 160*a* is used for controlling the transmit power of the first data stream from BS1; power control command stream 160*b* is used for controlling the transmit power of the first data stream from BS2; and power control command stream 160*n* is used for controlling the transmit power of the first data stream from BSn.

Power control command generator 160 forms each output power control command stream (i.e., streams 160*a*, 160*b*, ... 160*n*) by monitoring the signal quality of the first data stream received from multiple base stations in the first active set. Thus, for example, the power control command stream 160*b* for controlling the transmit power level of the first data stream 122 from the second base station (BS2) is formed by monitoring the signal quality of the first data stream 122 received from the second base station (BS2) as well as the signal quality of the first data stream 120 received from the first base station (BS1) and the signal quality of first data stream 124 received from base station BSn. Similarly, the power control command stream 160*a* for controlling the transmit power level of the first data stream 120 from the first base station (BS1) is formed by monitoring the signal quality of the first data stream 120 received from the first base station (BS1) as well as the signal quality of the first data stream 122 received from the second base station (BS2) and the signal quality of first data stream 124 received from base station BSn.

In one embodiment, the algorithm used by power control command generator 160 for generating each stream of power control commands 160*a*, 160*b*, . . . 160*n*, is as follows. Initially, power control command generator 160 identifies the base station ($BS_{highest}$) in the first active set that is providing the highest total signal-to-noise ratio (SNR) for the first data stream to mobile station 100*e*. Next, a total value representing the sum of the SNRs for the first data stream received from each base station in the first active set is compared to a threshold that represents a desired total SNR value that mobile station 100*e* expects to receive from all base stations in the first active set for the first data stream. Based on this comparsion, power control command generator 160 generates a power control command (i.e., a power up, power down or power hold command) for the first data stream from $BS_{highest}$ and this power control command ($PC_{BS-Highest}$) is then sent to $BS_{highest}$ using the power control command stream associated with $BS_{highest}$, i.e., either stream 160*a*, 160*b*, or . . . , 160*n*. Next, the power control command generator 160 generates a first predicted SNR value representing the sum of the SNRs for the first data stream that mobile station 100*e* expects to receive from all base stations in the first active set after $PC_{BS-Highest}$ is processed by $BS_{highest}$. Power control command generator 160 also identifies the base station ($BS_{second-highest}$) in the first active that is providing the second highest total SNR for the first data stream to mobile station 100*e*. Thereafter, the first predicted SNR value is compared to the threshold described above, and, based on this comparision, power control command generator 160 generates a power control command (i.e., a power up, power down or power hold command) for the first data stream from $BS_{second-highest}$ and this power control command ($PC_{BS-Second-Highest}$) is then sent to $BS_{second-highest}$ using the power control command stream associated with $BS_{second-highest}$, i.e., either stream 160*a*, 160*b*, or . . . ., 160*n*. Next, the power control command generator 160 generates a second predicted SNR value representing the sum of the SNRs for the first data stream that mobile station 100*e* expects to receive from all base stations in the first active set after $PC_{BS-Highest}$ and $PC_{BS-Second-Highest}$ are processed by $BS_{highest}$ and $BS_{second-highest}$. Power control command generator 160 also identifies the base station ($BS_{third-highest}$) in the first active that is providing the third highest total SNR for the first data stream to mobile station 100e. Thereafter, the second predicted SNR value is compared to the threshold described above, and, based on this comparision, power control command generator 160 generates a power control command (i.e., a power up, power down or power hold command) for the first data stream from $BS_{third-highest}$ and this power control command ($PC_{BS-Third-Highest}$) is then sent to $BS_{third-highest}$ using the power control command stream associated with $BS_{third-highest}$, i.e., either stream 160a, 160b, or . . . , 160n. This process is then repeated as described above in an iterative manner until power control command generator 160 has generated a power control command for each base station in the first active set.

Referring still to FIG. 1E, power control command generator 162 generates a single (common) stream of power control commands 162a for controlling the second data stream from each base station in the second active set. Thus, power control command stream 162a is used for controlling the transmit power of the second data stream from BS2, the transmit power of the second data stream from BS2, and the transmit power of the second data stream from BSm. Power control command generator 162 forms power control command stream 162 by simultaneously monitoring the signal quality of the second data stream received from all base stations in the second active set. In one embodiment, the algorithm used by power control command generator 162 for generating the stream of power control commands 162a is as follows. Power control command generator 162 calculates a total value representing the sum of the SNRs for the second data stream received from each base station in the second active set. This sum is compared to a threshold that represents a desired total SNR value that mobile station 100e expects to receive from all base stations in the second active set for the second data stream. Based on this comparsion, power control command generator 162 generates a power control command (i.e., a power up, power down or power hold command) for the second data stream and this power control command is then sent to the base stations in the second active set using stream 162a.

The power control command streams 160a, 160b, . . . 160n and 162a are provided to a mutliplexer 146 which is controlled by an interleaver controller 148. The mutliplexer 146 merges the separate power control command streams into a single interleaved power control bit stream 110. A transmitter 150 transmits the interleaved power control bit stream 110 back to the base stations in the first and second active sets on a power control channel or subchannel.

Figure 1F:
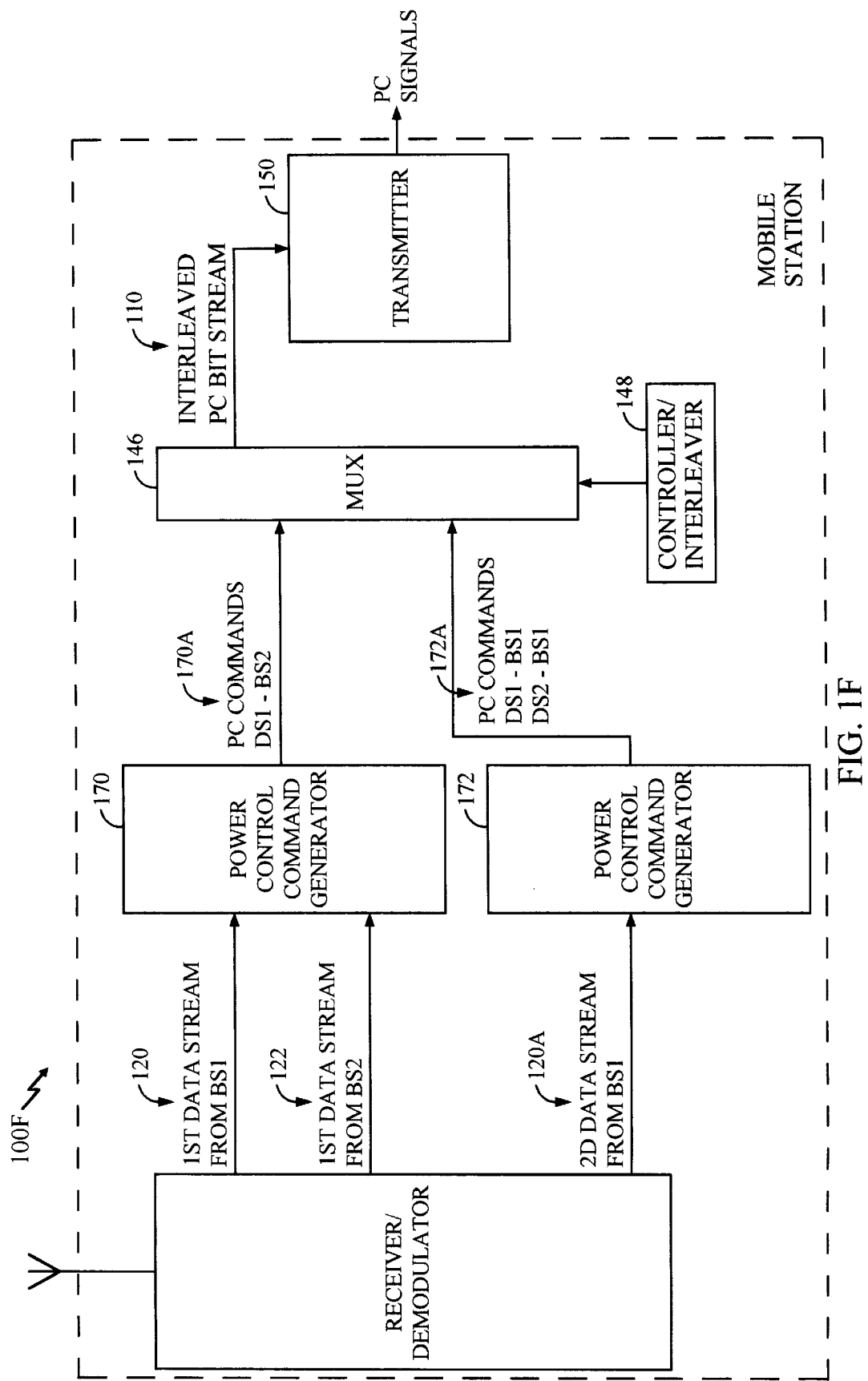
FIG. 1F shows a further alternate embodiment of the mobile radio station of the present invention. In this embodiment, a first data stream is transmitted to the mobile station from at least first and second base stations, and a second data stream is transmitted to the mobile station from the first base station. The transmit power level of the first data stream from the second base station is controlled at the mobile station by monitoring the signal quality of the first data stream received from the first base station as well as the signal quality of the first data stream received from the second base station. The transmit power levels of the first and second data streams from the first base station are controlled at the mobile station by monitoring the signal quality of the second data stream received from the first base station.

FIG. 1F shows a mobile radio station 100f that forms an interleaved power control bit stream in accordance with a further alternate embodiment of the present invention. In this embodiment, a first set of active base stations (BS1, BS2) simultaneously transmit versions of the first data stream (e.g., signals 120, 122) to the mobile station 100f, and a second set of active base stations (BS1) transmit the second data stream (signal 120a) to the mobile station 100f. In this embodiment, the transmit power level of the first data stream 122 from the second base station (BS2) is controlled at the mobile station 100f by monitoring the signal quality of the first data stream 120 received from the first base station as well as the signal quality of the first data stream 122 received from the second base station. However, in contrast to the embodiment of FIG. 1E, in this embodiment the transmit power levels of the first and second data streams (120, 120a) from the first base station are controlled at the mobile station by monitoring the signal quality of only the second data stream 120a received from the first base station.

Referring still to FIG. 1F, power control command generator 170 forms output power control command stream 170a by monitoring the signal quality of the first data stream received from multiple base stations in the first active set. Thus, for example, the power control command stream 170a for controlling the transmit power level of the first data stream 122 from the second base station (BS2) is formed by monitoring the signal quality of the first data stream 122 received from the second base station (BS2) as well as the signal quality of the first data stream 120 received from the first base station (BS1). In one embodiment, the algorithm used by power control command generator 170 for generating the stream of power control commands 170a is as follows. Power control command generator 170 calculates a total value representing the sum of the SNRs for the first data stream received from each base station in the first active set. This sum is compared to a threshold that represents a desired total SNR value that mobile station 100f expects to receive from all base stations in the first active set for the first data stream. Based on this comparsion, power control command generator 170 generates a power control command (i.e., a power up, power down or power hold command) that is then sent using stream 170a.

Power control command generator 172 monitors either the received signal-to-noise ratio or the frame error rate associated with the second data stream 120a from the first base station, and generates a stream of forward link power control commands 172a based on this information. As set forth above, deriving such a stream of power control commands using either the received signal-to-noise ratio or the frame error rate of a received signal is well known in the art.

The power control command streams 170a and 172a are provided to a mutliplexer 146 which is controlled by an interleaver controller 148. The mutliplexer 146 merges the separate power control command streams into a single interleaved power control bit stream 110. A transmitter 150 transmits the interleaved power control bit stream 110 back to the base stations in the first and second active sets on a power control channel or subchannel.

Figure 1G:
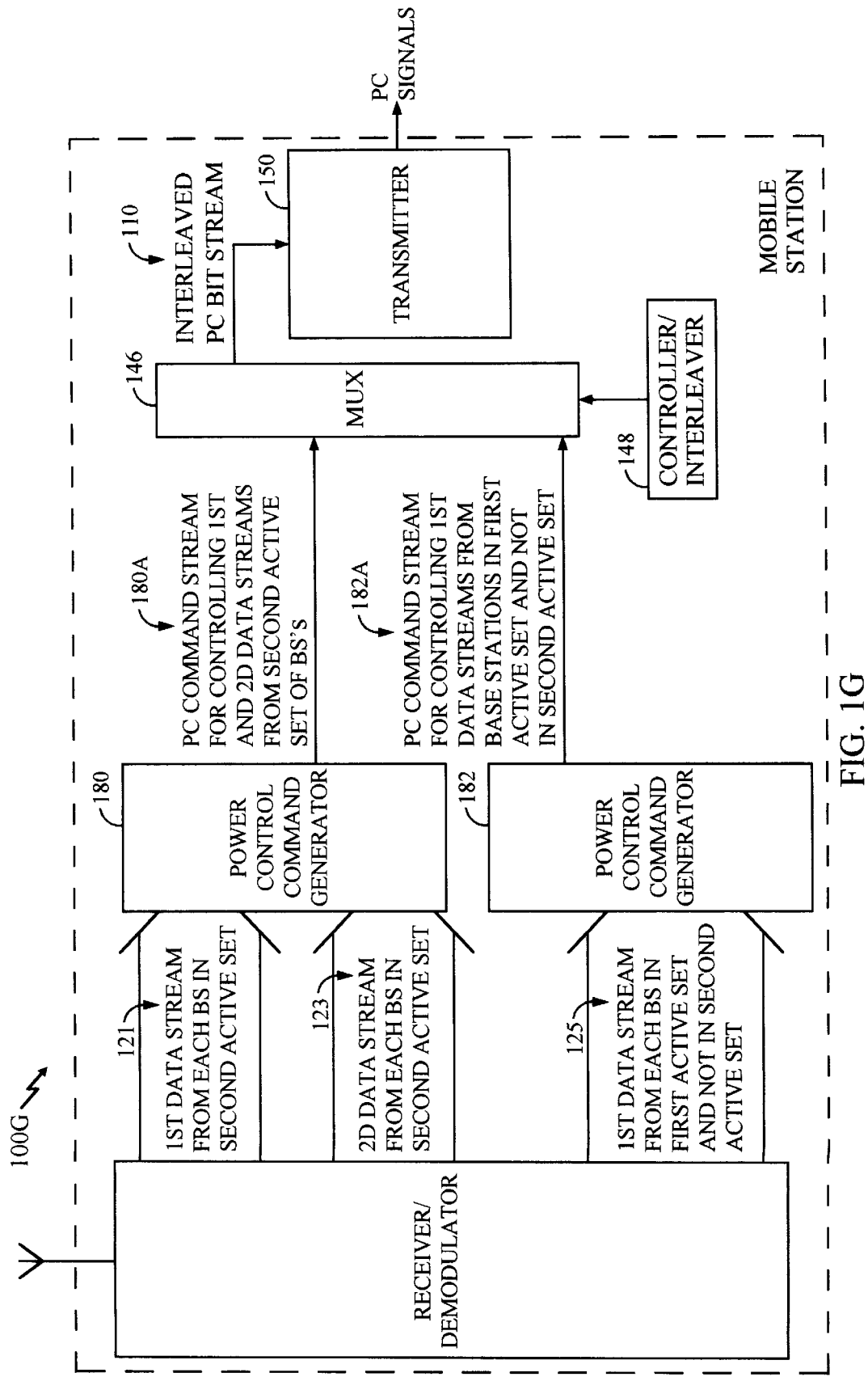
FIG. 1G shows a further alternate embodiment of the mobile radio station of the present invention. In this embodiment, a first (common) power control command stream is generated from the first data stream from each base station in the second active set and the second data stream from each base station in the second active set, and then used for controlling the transmit power level of the second data stream from each base station in the second active set and the first data stream from each base station in the second active set. A second (common) power control stream is generated from the first data stream from each base station in the first active set and not in the second active set, and then used for controlling the transmit power level of the first data stream from each base station in the first active set and not in the second active set.

FIG. 1G shows a mobile radio station 100g that forms an interleaved power control bit stream in accordance with a further alternate embodiment of the present invention. Again, in this embodiment, a first set of active base stations (BS1, BS2, . . . BSn) simultaneously transmit versions of a first data stream to the mobile station 100g, and a second set of active base stations (BS1, BS2, . . . BSm) simultaneously transmit versions of a second data stream to the mobile station 100g. In this embodiment, a first (common) power control command stream 180a is generated from the versions of the first data stream transmitted from each base station in the second active set (collectively labeled 121) and from the versions of the second data stream transmitted from each base station in the second active set (collectively labeled 123). Power control command stream 180a is then used for controlling the transmit power level of the second data stream from each base station in the second active set (collectively labeled 121) and the first data stream from each base station in the second active set (collectively labeled 123). A second (common) power control stream 182a is generated from the first data stream from each base station in the first active set and not in the second active set (collectively labeled 125), and then used for controlling the transmit power level of the first data stream from each base station in the first active set and not in the second active set.

Referring still to FIG. 1G, power control command generator 180 forms a single (common) output power control command stream 180a by simultaneously monitoring the signal quality of traffic signals 121 and 123 which respectively represent the first data stream transmitted from each base station in the second active set and the second data stream transmitted from each base station in the second active set. In one embodiment, the algorithm used by power control command generator 180 for generating the stream of power control commands 180*a* is as follows. Power control command generator 180 calculates a total value representing the sum of the signal to noise ratios (SNRs) for the first data stream received from each base station in the second active set (i.e., streams 121). This sum is compared to a first threshold that represents a desired total SNR value that mobile station 100*g* expects to receive from all base stations in the second active set for the first data stream. Power control command generator 180 also calculates a total value representing the sum of the SNRs for the second data stream received from each base station in the second active set (i.e., streams 123). This sum is compared to a second threshold that represents a desired total SNR value that mobile station 100*g* expects to receive from all base stations in the second active set for the second data stream. If, in either of the above comparsions the threshold has not been exceeded, power control command generator 180 generates a power-up command that is then sent using stream 180*a*; alternatively, if in either of the above comparsions the threshold has been exceeded, power control command generator 180 generates a power-down command that is then sent using stream 180*a*.

Power control command generator 182 forms a single (common) output power control command stream 182*a* by simultaneously monitoring the signal quality of traffic signals 125 which respectively represent the first data stream transmitted from each base station in the first active set and not in the second active set. In one embodiment, the algorithm used by power control command generator 182 for generating the stream of power control commands 182*a* is as follows. Power control command generator 182 calculates a total value representing the sum of the SNRs for the first data stream received from each base station in the first active set and not in the second active set. This sum is compared to a threshold that represents a desired total SNR value that mobile station 100*g* expects to receive from all base stations in the first active set and not in the second active set for the first data stream. Based on this comparsion, power control command generator 182 generates a power control command (i.e., a power up, power down or power hold command) that is then sent using stream 182*a*. The power control command streams 180*a* and 182*a* are provided to a mutliplexer 146 which is controlled by an interleaver controller 148. The mutliplexer 146 merges the separate power control command streams into a single interleaved power control bit stream 110. A transmitter 150 transmits the interleaved power control bit stream 110 back to the base stations in the first and second active sets on a power control channel or subchannel.

Figure 1H:
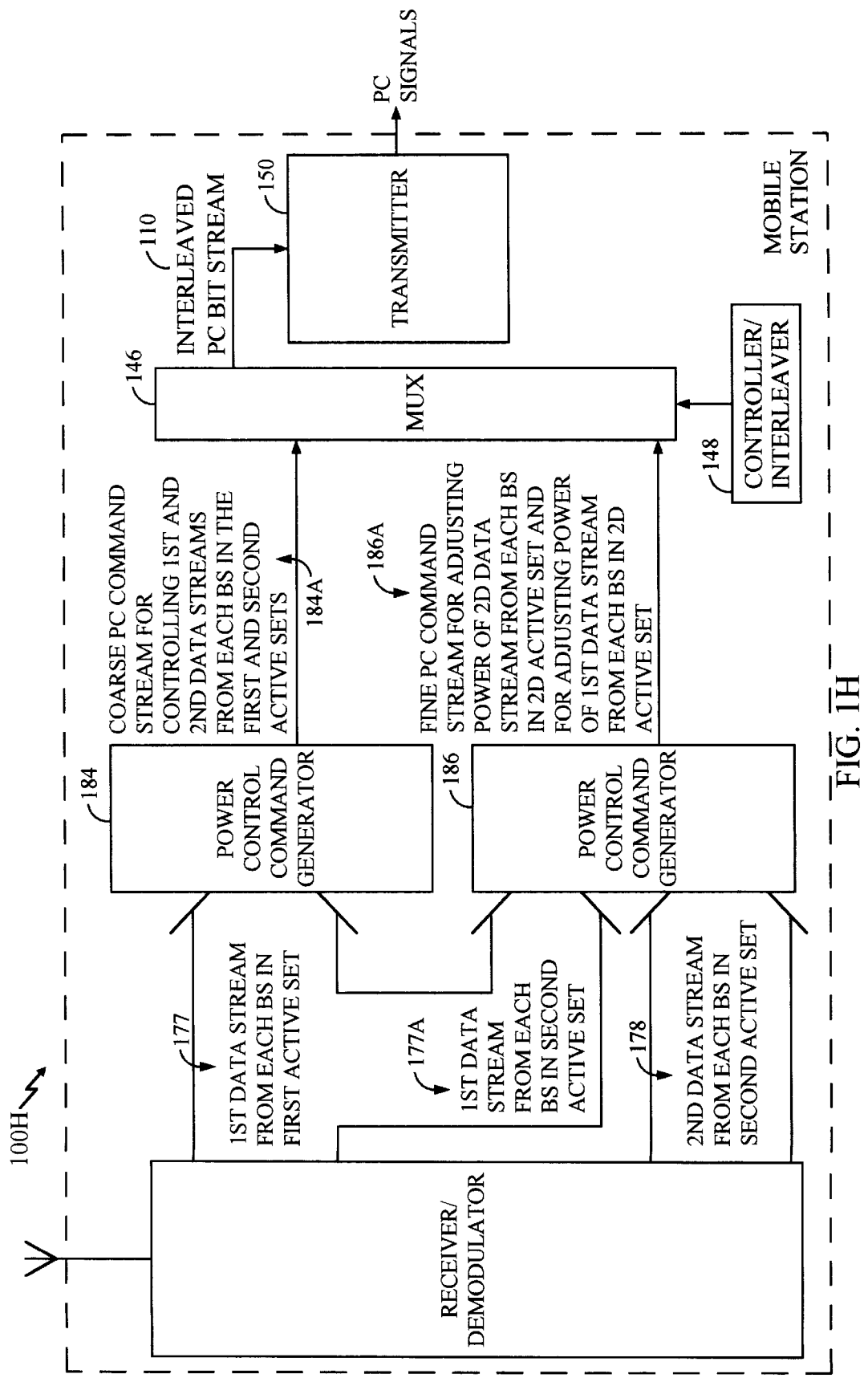
FIG. 1H shows a further alternate embodiment of the mobile radio station of the present invention. In this embodiment, a coarse power control command stream is generated from the first data stream from each base station in the first active set, and then used for controlling the transmit power level of the first data stream from each base station in the first active set and the transmit power level of the second data stream from each base station in the second active set. A fine power control stream is generated from the first data stream from each base station in the second active set and the second data stream from each base station in the second active set, and then used in combination with the coarse power control command stream for controlling the transmit power level of the second data stream from each base station in the second active set and the first data stream from each base station in the second active set.
Figure 11:
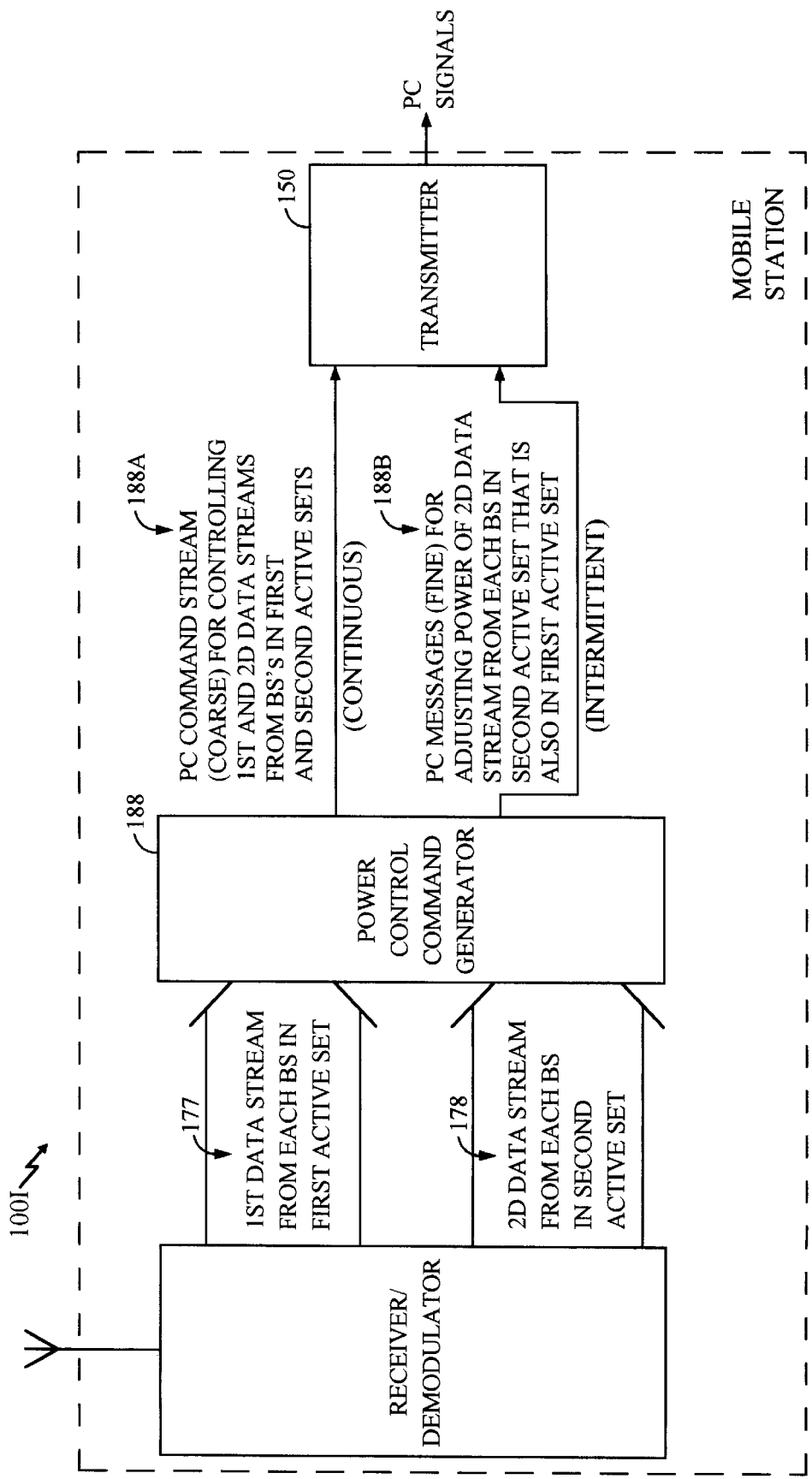

FIG. 1H shows a mobile radio station 100*h* that forms an interleaved power control bit stream in accordance with a still alternate embodiment of the present invention. Again, in this embodiment, a first set of active base stations (BS1, BS2, . . . BSn) simultaneously transmit versions of a first data stream to the mobile station 100*h*, and a second set of active base stations (BS1, BS2, . . . BSm) simultaneously transmit versions of a second data stream to the mobile station 100*h*. In this embodiment, a first (common) power control command stream 184*a* is generated from the versions of the first data stream transmitted from each base station in the first active set (collectively labeled 177). Power control command stream 184*a* contains coarse power control commands. As explained more fully below, the coarse power control command stream 184*a* is used for controlling the transmit power level of the first and second data streams from each base station in the first and second active sets (collectively labeled 177, 178). A second (common) power control stream 186*a* is generated from the first data stream from each base station in the second active set (collectively labeled 177*a*). Signals 177*a* represent a subset of signals 170. Power control command stream 186*a* contains fine power control commands. As explained more fully below, the fine power control command stream 186*a* is used, in combination with the coarse power control command stream 184*a*, for controlling the transmit power level of the second data stream transmitted from each base station in the second active set (signals 178) and for controlling the transmit power level of the first data stream transmitted from each base station in the second active set (signals 177*a*).

Referring still to FIG. 1H, power control command generator 184 forms a single (common) coarse power control command stream 184*a* by simultaneously monitoring the signal quality of traffic signals 177 which represent the first data stream transmitted from each base station in the first active set. In one embodiment, the algorithm used by power control command generator 184 for generating the stream of power control commands 184*a* is as follows. Power control command generator 184 calculates a total value representing the sum of the SNRs for the first data stream received from each base station in the first active set. This sum is compared to a threshold that represents a desired total SNR value that mobile station 100*h* expects to receive from all base stations in the first active set for the first data stream. Based on this comparsion, power control command generator 184 generates a power control command (i.e., a power up, power down or power hold command) that is then sent using stream 184*a*.

In one embodiment, the algorithm used by power control command generator 184 for generating the stream of power control commands 184*a* is as follows. Power control command generator 184 calculates a total value representing the sum of the SNRs for the first data stream received from each base station in the first active set. This sum is compared to a threshold that represents a desired total SNR value that mobile station 100*h* expects to receive from all base stations in the first active set for the first data stream. Based on this comparsion, power control command generator 184 generates a power control command (i.e., a power up, power down or power hold command) that is then sent using stream 184*a*.

Power control command generator 186 forms a single (common) fine power control command stream 186*a* by simultaneously monitoring the signal quality of traffic signals 177*a* and 178 which respectively represent the first data stream transmitted from each base station in the second active set and the second data stream transmitted from each base station in the second active set. In one embodiment, the algorithm used by power control command generator 186 for generating the stream of power control commands 186*a* is as follows. Power control command generator 186 calculates a total value representing the sum of the SNRs for the first data stream received from each base station in the second active set (i.e., streams 177*a* only). This sum is compared to a threshold that represents a desired total SNR value that mobile station 100*h* expects to receive from all base stations in the second active set for the first data stream. Based on this comparsion, power control command generator 186 generates a power control command (i.e., a power up, power down or power hold command) that is then sent using stream 186*a*.

In an alternate embodiment, a different algorithm is used by power control command generator 186 for generating the stream of power control commands 186*a*. In this alternate embodiment, power control command generator 186 calculates a total value representing the scaled sum of the SNRs for the first data stream received from each base station in the second active set and the SNRs for the second data stream from each base station in the second active set (i.e., streams 177a and 178). This sum is compared to a threshold that represents a desired total SNR value that mobile station 100h expects to receive from base stations in the second active set for the first data stream and from base stations in the second active set for the second data stream. Based on this comparsion, power control command generator 186 generates a power control command (i.e., a power up, power down or power hold command) that is then sent using stream 186a.

The power control command streams 184a and 186a are provided to a mutliplexer 146 which is controlled by an interleaver controller 148. The mutliplexer 146 merges the separate power control command streams into a single interleaved power control bit stream 110. A transmitter 150 transmits the interleaved power control bit stream 110 back to the base stations in the first and second active sets on a power control channel or subchannel.

FIG. 1I shows a mobile radio station 100i that forms an interleaved power control bit stream in accordance with a still alternate embodiment of the present invention. Again, in this embodiment, a first set of active base stations (BS1, BS2, . . . BSn) simultaneously transmit versions of a first data stream to the mobile station 100i, and a second set of active base stations (BS1, BS2, . . . BSm) simultaneously transmit versions of a second data stream to the mobile station 100i. In this embodiment, a first (common) power control command stream 188a is generated from the versions of the first data stream transmitted from each base station in the first active set (collectively labeled 177) and from the versions of the second data stream transmitted from each base station in the second active set (collectively labeled 178). Power control command stream 188a contains coarse power control commands. As explained more fully below, the coarse power control command stream 188a is used for controlling the transmit power level of the first and second data streams from each base station in the first and second active sets (collectively labeled 177, 178). A second (common) power control stream 188b is generated from the first data stream from each base station in the first active set (signals 177) and from the second data stream from each base station in the second active set (signals 178.) Power control command stream 186b contains fine power control commands. As explained more fully below, the fine power control command stream 188b is used, in combination with the coarse power control command stream 188a, for controlling the transmit power level of the second data stream transmitted from each base station in the second active set and not in the first active set.

Referring still to FIG. 1I, power control command generator 188 forms the single (common) coarse power control command stream 188a and the single (common) fine power control command stream 188b by simultaneously monitoring the signal quality of traffic signals 177, 178 which respectively represent the first data stream transmitted from each base station in the first active set and the second data stream from each base station in the second active set. In one embodiment, the algorithm used by power control command generator 188 for generating the stream of power control commands 188a is as follows. Power control command generator 188 calculates a total value representing the sum of the SNRs for the first data stream received from each base station in the first active set (i.e., streams 177 only). This sum is compared to a threshold that represents a desired total SNR value that mobile station 100i expects to receive from all base stations in the first active set for the first data stream. Based on this comparsion, power control command generator 188 generates a power control command (i.e., a power up, power down or power hold command) that is then sent using stream 188a.

In one embodiment, the algorithm used by power control command generator 188 for generating power control command stream 188b is as follows. First, power control command generator 188 calculates a total value representing the sum of the SNRs for the second data stream received from each base station in the second active set (i.e., streams 178 only). Next, this sum is adjusted based on the last power control command sent using stream 188a. More particularly, the power control command generator 180 generates a predicted SNR value representing the sum of the SNRs for the second data stream that mobile station 100i expects to receive from all base stations in the second active after the previous power control command sent on stream 188a is processed by such base stations. The predicted SNR value is then compared to a threshold that represents a desired total SNR value that mobile station 100i expects to receive from all base stations in the second active set for the second data stream. Based on this comparsion, power control command generator 188 generates a power control command (i.e., a power up, power down or power hold command) for the second data stream from each base station in the second active set, and this power control command is sent using power control command stream 188b.

The power control command streams 188a and 188b are provided to a mutliplexer 146 which is controlled by an interleaver controller 148. The mutliplexer 146 merges the separate power control command streams into a single interleaved power control bit stream 110. A transmitter 150 transmits the interleaved power control bit stream 110 back to the base stations in the first and second active sets on a power control channel or subchannel.

In an alternate embodiment of the mobile station shown in FIG. 1I, power control command stream 188a is used for controlling the first and second data streams from base stations that are in the first active set and not in the second active set.

Figure 2A:
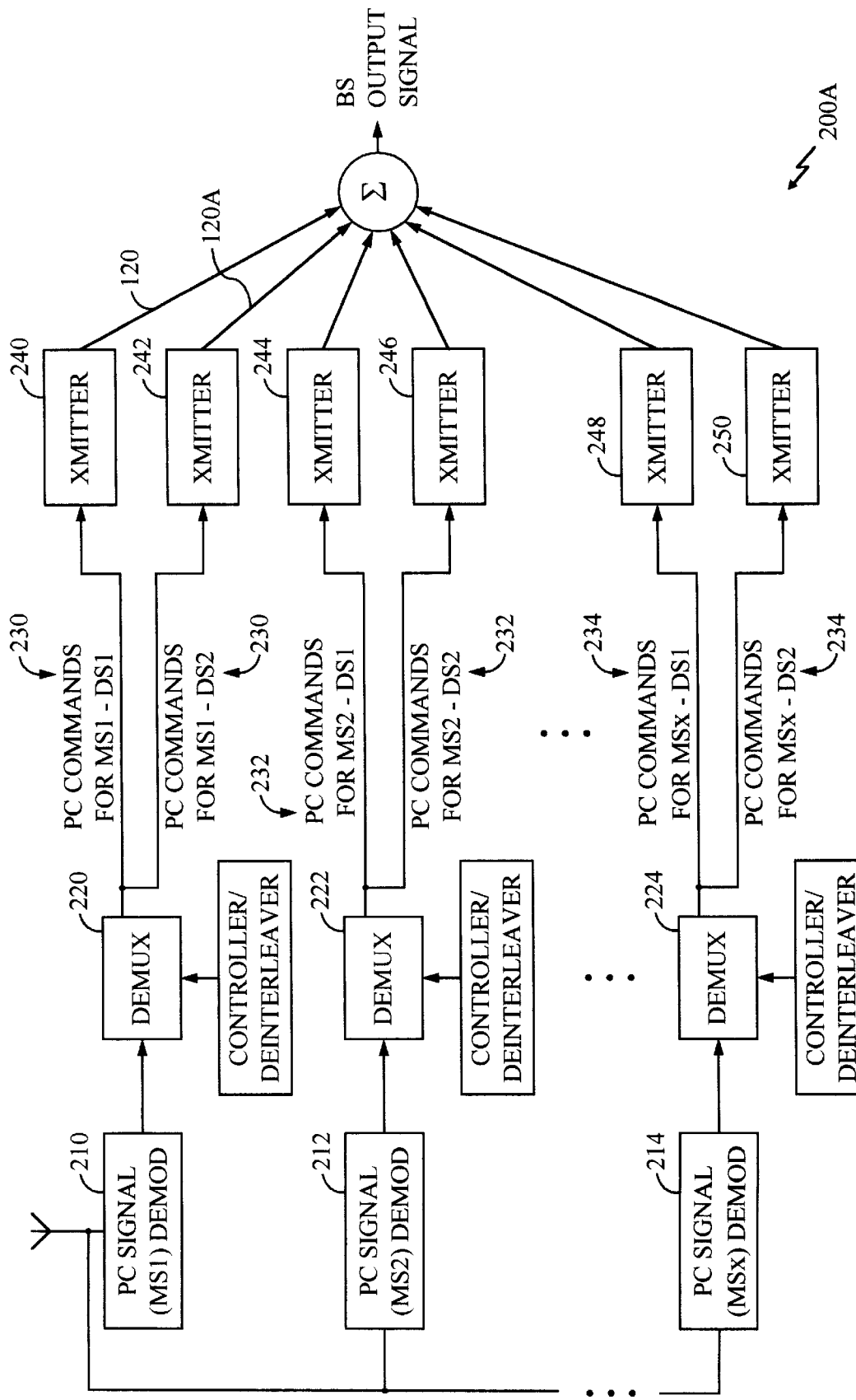
FIG. 2A shows a base station that receives a plurality of interleaved power control signals from a plurality of mobile stations, and uses the power control signals to control the transmit power levels of different data streams transmitted to the mobile stations, in accordance with a preferred embodiment of the present invention. In the embodiment of FIG. 2A, the transmit power levels of different data streams transmitted to the same mobile station from the base station are controlled using a common stream of power control commands included in an interleaved power control signal.

Referring now to FIG. 2A, there is shown the components of a base station 200a that receives a plurality of interleaved power control signals from a plurality of mobile stations (MS1, MS2 . . . MSm), and uses the power control signals to control the transmit power levels of different data streams transmitted to the mobile stations, in accordance with a preferred embodiment of the present invention. In the embodiment of FIG. 2A, the transmit power levels of different data streams transmitted to a mobile station 100a (as shown in FIG. 1A) from base station 200a are controlled using a common stream of power control commands included in an interleaved power control signal received at base station 200a. Interleaved power control signals 110 received from the mobile stations (MS1, MS2, . . . MSm) are provided to power control signal demodulation units 210, 212, 214. Demodulation unit 210 demodulates an interleaved power control signal 110 transmitted to base station 200 from a first mobile station (MS1), demodulation unit 212 demodulates an interleaved power control signal 110 transmitted to base station 200 from a second mobile station (MS2), and demodulation unit 214 demodulates an interleaved power control signal transmitted to base station 200 from a further mobile station (MSn). In the embodiment shown in FIG. 2A, each interleaved power stream 110 is formed using a mobile station such as mobile station 100a wherein a common stream of power control commands are included in an interleaved power control signal 110 in order to control the transmit power levels of different data streams transmitted to the mobile station from the same base station.

The output of demodulation unit 210 is provided to a demultiplexer 220 which deinterleaves the power control signal from the first mobile station (MS1) in order to extract a power control bit stream 230 representative of the stream of power control commands 140 transmitted to base station 200 from the first mobile station (MS1). The power control bit stream 230 is used to control the gain (or transmit power level) of transmitters 240, 242, which respectively transmit first and second different data streams 120, 120a back to the first mobile station (MS1). The output of demodulation unit 212 is provided to a demultiplexer 222 which deinterleaves the power control signal from a second mobile station (MS2) in order to extract a power control bit stream 232 representative of a stream of power control commands transmitted to base station 200 from the second mobile station (MS2). The power control bit stream 232 is used to control the gain (or transmit power level) of transmitters 244, 246, which respectively transmit different data streams back to the second mobile station (MS2). Similarly, the output of demodulation unit 214 is provided to a demultiplexer 224 which deinterleaves the power control signal from a further mobile station (MSm) in order to extract a power control bit stream 234 representative of a stream of power control commands transmitted to base station 200 from the further mobile station (MSm). The power control bit stream 234 is used to control the gain (or transmit power level) of transmitters 248, 250, which respectively transmit different data streams back to the further mobile station (MSm). In one embodiment, each of the demodulation units 210, 212, 214 is configured to receive an interleaved power control signal on a different one of a plurality of power control subchannels, wherein each of the plurality of power control subchannels is associated with a different mobile station in the mobile radio communication system.

Although power control signals from three mobile stations 100a are shown as being received by base station 200a, it will be understood by those skilled in the art that base station 200a could be configured to receive power control signals from more than (or less than) three different mobile stations.

Figure 2B:
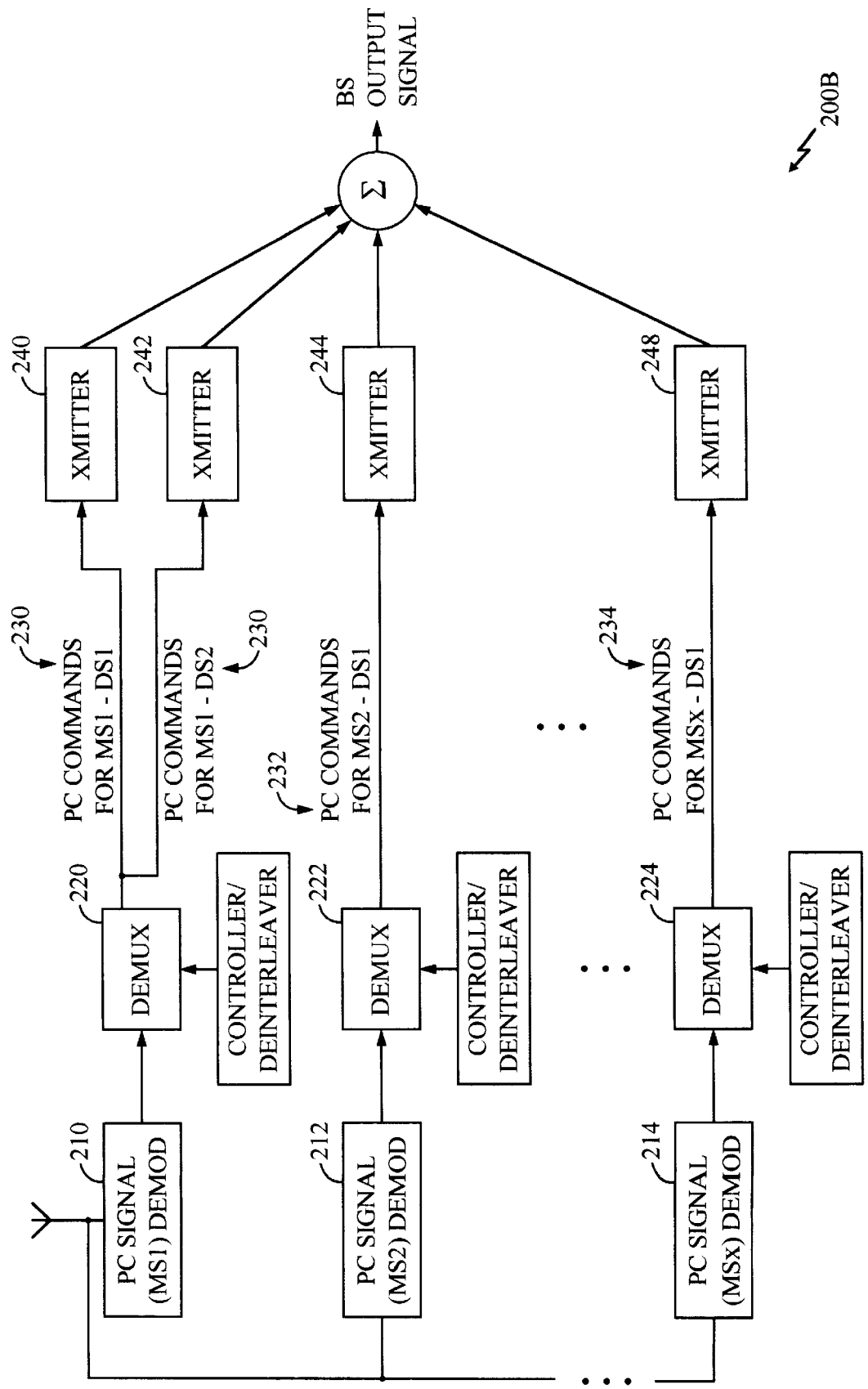
FIG. 2B shows an alternate preferred embodiment of the base station of FIG. 2A.

FIG. 2B shows an alternate preferred embodiment of the base station of FIG. 2A. In FIG. 2B, base station 200b transmits a plurality of different data streams 120, 120a to a first mobile station (MS1), and only a single data stream to other mobile stations (MS2, MSm) on the base station's forward link. Thus, in base station 200b, the power control bit stream 232 is used to control the gain (or transmit power level) of a single transmitter 244 which transmits one data stream back to the second mobile station (MS2), and power control bit stream 234 is used to control the gain of a single transmitter 248 which transmits one data stream back to the further mobile station (MSm). The signal output by transmitter 244 in FIG. 2B may correspond, for example, to the first data stream 122 from BS2 that is provided to the power control command generator 132a in FIG. 1B, because in the mobile station of FIG. 1B only the first data stream (and not the second stream) is provided to mobile station 100b from BS2.

Figure 2C:
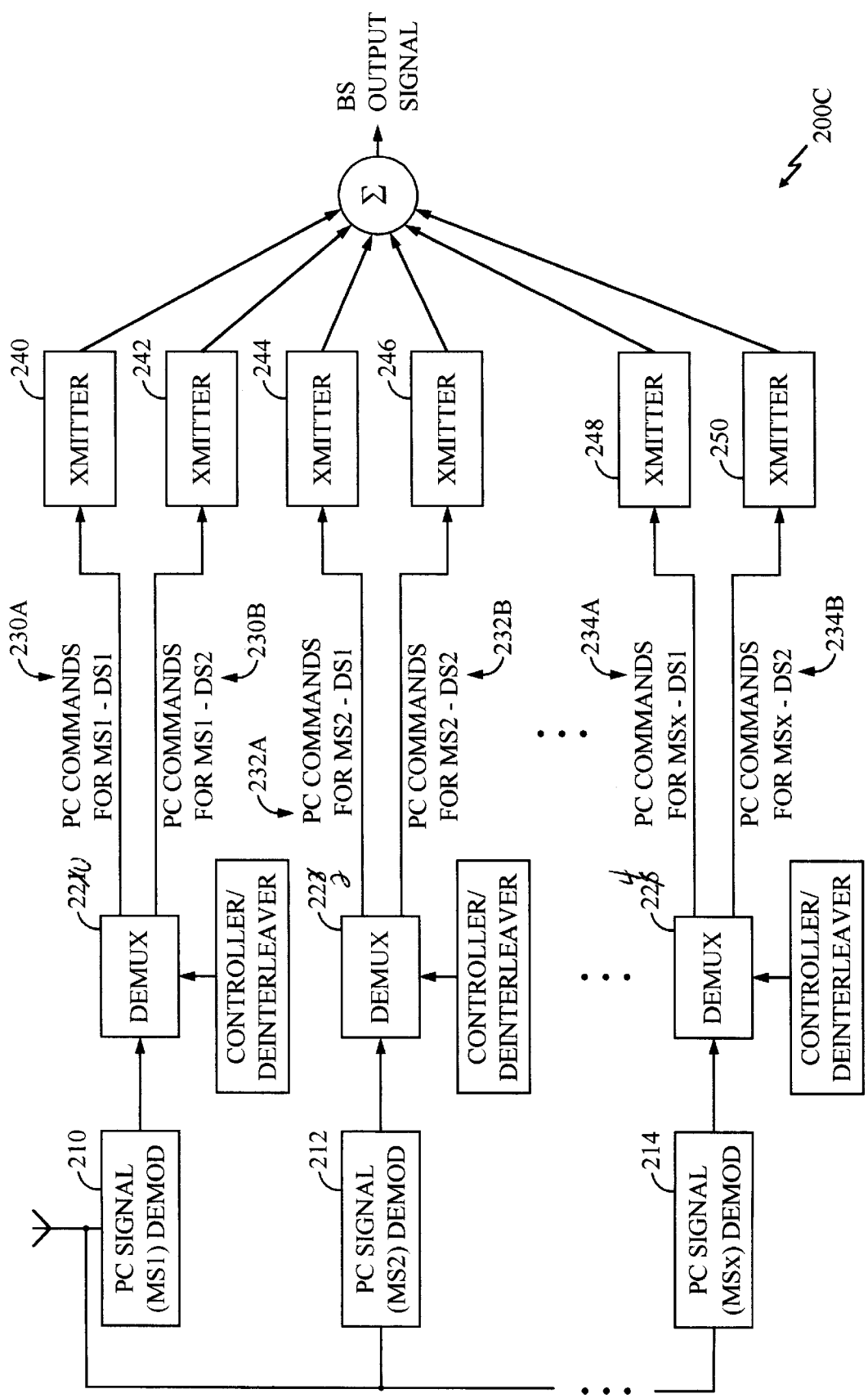
FIG. 2C shows a base station that receives a plurality of interleaved power control signals from a plurality of mobile stations, and uses the power control signals to control the transmit power levels of different data streams transmitted to the mobile stations, in accordance with an alternate preferred embodiment of the present invention. In the embodiment of FIG. 2C, the transmit power levels of different data streams transmitted to the same mobile station from the base station are controlled using different streams of power control commands included in an interleaved power control signal.

Referring now to FIG. 2C, there is shown the components of a base station 200c that receives a plurality of interleaved power control signals from a plurality of mobile stations (MS1, MS2 . . . MSm), and uses the power control signals to control the transmit power levels of different data streams transmitted to the mobile stations, in accordance with an alternative preferred embodiment of the present invention. In the embodiment of FIG. 2C, the transmit power levels of different data streams transmitted to a mobile station 100c (as shown in FIG. 1C) from base station 200c are controlled using different streams of power control commands included in an interleaved power control signal received at base station 200c. Interleaved power control signals 110 received from the mobile stations (MS1, MS2, . . . MSm) are provided to power control signal demodulation units 210, 212, 214. Demodulation unit 210 demodulates an interleaved power control signal 110 transmitted to base station 200c from a first mobile station (MS1), demodulation unit 212 demodulates an interleaved power control signal 110 transmitted to base station 200 from a second mobile station (MS2), and demodulation unit 214 demodulates an interleaved power control signal transmitted to base station 200 from a further mobile station (MSn). In the embodiment shown in FIG. 2C, each interleaved power stream 110 is formed using a mobile station such as mobile station 100c wherein different streams of power control commands are included in an interleaved power control signal 110 in order to control the transmit power levels of different data streams transmitted to the mobile station from the same base station.

In FIG. 2C, the output of demodulation unit 210 is provided to a demultiplexer 220 which deinterleaves the power control signal from the first mobile station (MS1) in order to extract power control bit streams 230a, 230b which are respectively representative of the streams of power control commands 140a, 140b transmitted to base station 200c from the first mobile station (MS1). The power control bit streams 230a, 230b are used to control the gain (or transmit power level) of transmitters 240, 242, which respectively transmit first and second different data streams 120, 120a back to the first mobile station (MS1). The output of demodulation unit 212 is provided to a demultiplexer 222 which deinterleaves the power control signal from a second mobile station (MS2) in order to extract power control bit streams 232a, 232b which are respectively representative of streams of power control commands transmitted to base station 200b from the second mobile station (MS2). The power control bit streams 232a, 232b are used to control the gain (or transmit power level) of transmitters 244, 246, which respectively transmit different data streams back to the second mobile station (MS2). Similarly, the output of demodulation unit 214 is provided to a demultiplexer 224 which deinterleaves the power control signal from a further mobile station (MSm) in order to extract power control bit streams 234a, 234b representative of streams of power control commands transmitted to base station 200c from the further mobile station (MSm). The power control bit streams 234a, 234b are used to control the gain (or transmit power level) of transmitters 248, 250, which respectively transmit different data streams back to the further mobile station (MSm).

Figure 2D:
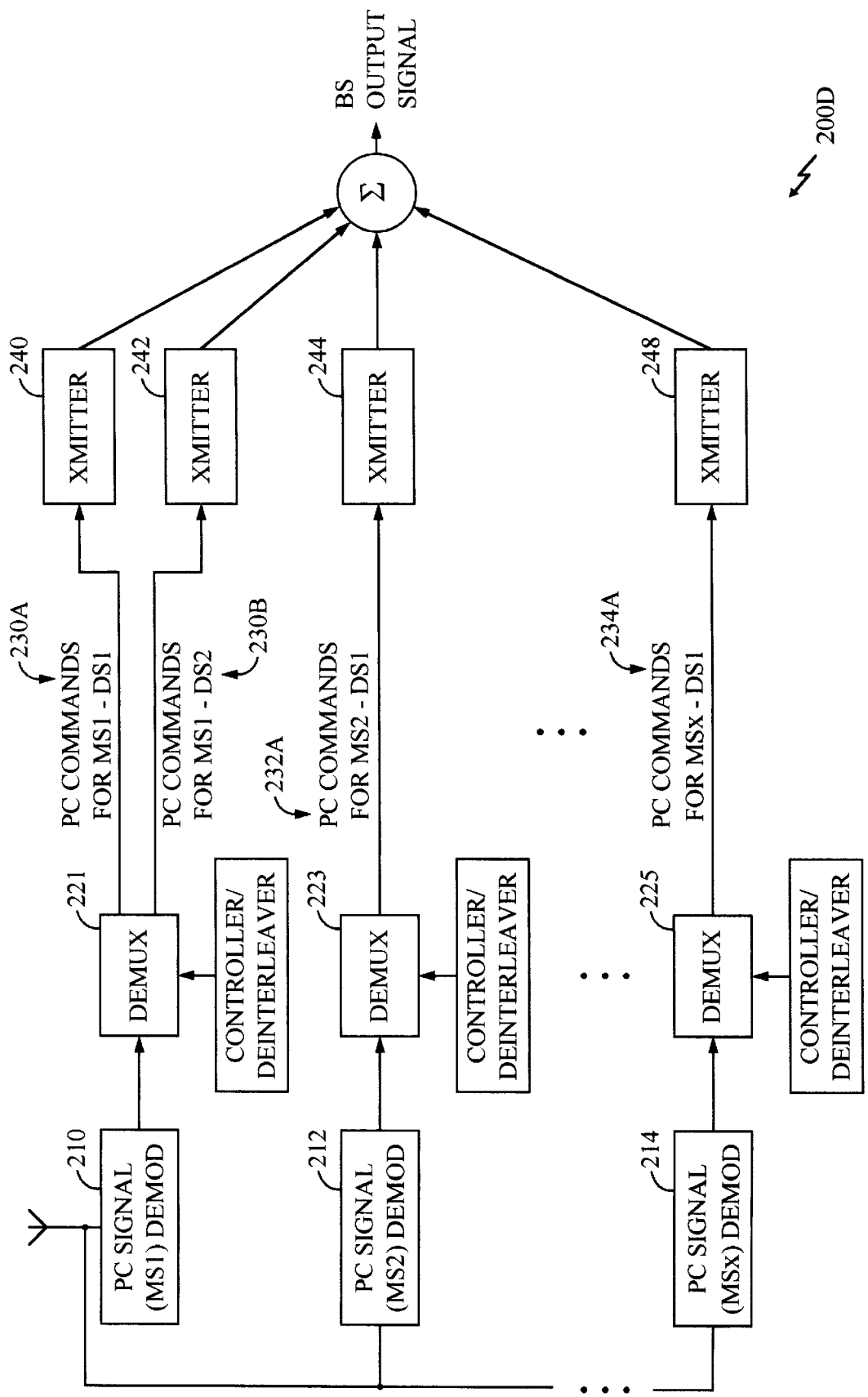
FIG. 2D shows an alternate preferred embodiment of the base station of FIG. 2C.

FIG. 2D shows an alternate preferred embodiment of the base station of FIG. 2C. In FIG. 2D, base station 200d transmits a plurality of different data streams 120, 120a to a first mobile station (MS1), and only a single data stream to other mobile stations (MS2, MSm) on the base station's forward link. ). The signal output by transmitter 244 in FIG. 2D may correspond, for example, to the first data stream 122 from BS2 that is provided to the power control command generator 133a in FIG. 1D, because in the mobile station of FIG. 1D only the first data stream (and not the second stream) is provided to mobile station 100d from BS2.

A communication system operating in accordance with the present invention may be formed of one or more mobile stations configured in accordance with mobile stations 100a or 100b that receive data traffic signals from and transmit interleaved power control signals to a plurality of different base stations configured in accordance with base stations 200a or 200b. Alternatively, a communication system operating in accordance with the present invention is formed of one or more mobile stations configured in accordance with mobile stations 100c or 100d that receive data traffic signals from and transmit interleaved power control signals to a plurality of different base stations configured in accordance with base stations 200c or 200d.

In a still further alternative, a communication system operating in accordance with the present invention is formed of one or more mobile stations configured in accordance with mobile station 100e that receive data traffic signals from and transmit interleaved power control signals to a plurality of different base stations configured substantially in accordance with base stations 200d except, in this embodiment 230, 232a, 234a and 230b shown in FIG. 2D would correspond to signals 160a, 160b, 160c and 162 produced from a mobile station of the form shown in FIG. 1E.

Figure 2E:
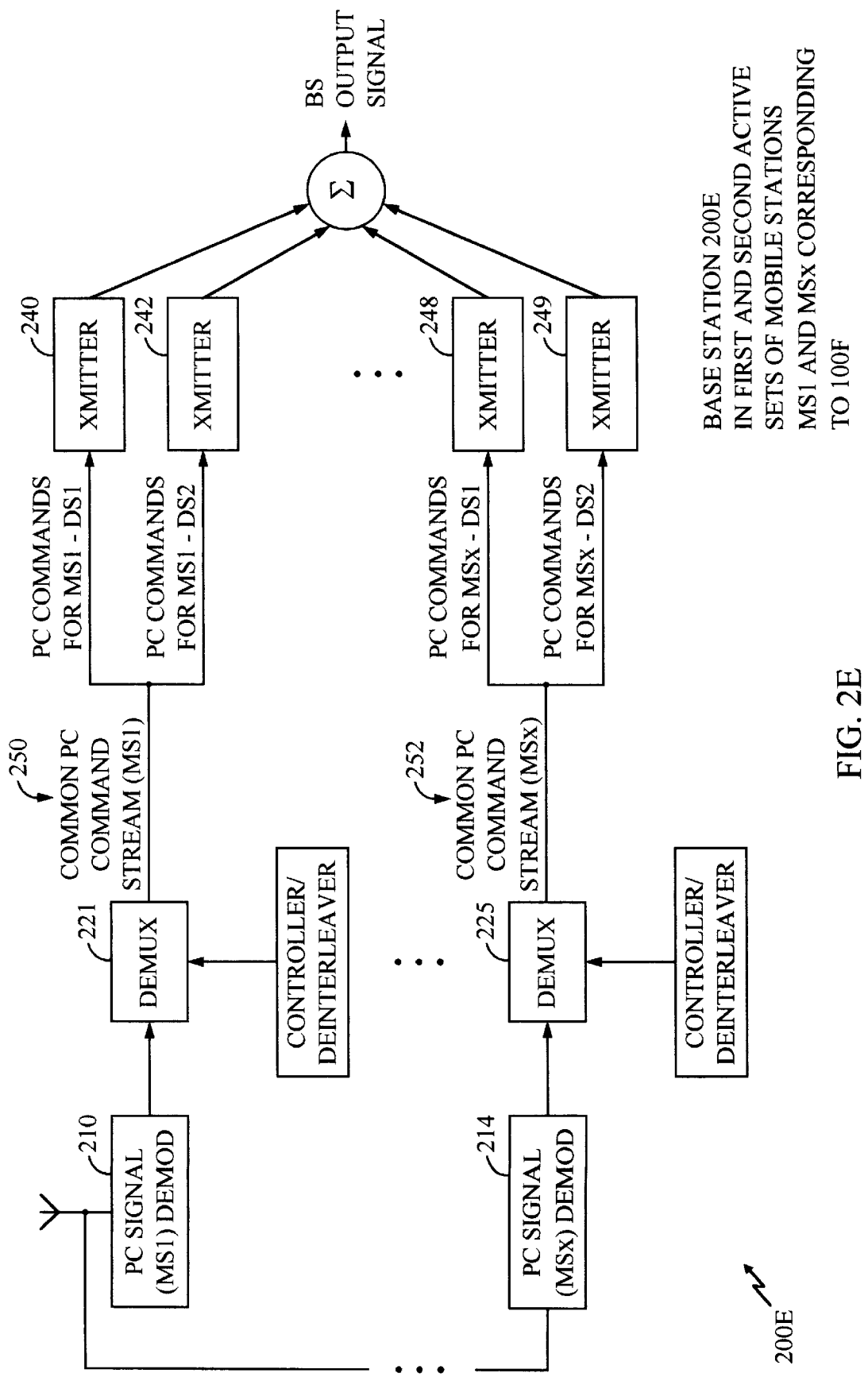
FIG. 2E shows a base station that receives a plurality of power control signals formed from a plurality of mobile stations of the form shown in FIG. 1F, and uses the power control signals to control the transmit power levels of first and second data streams transmitted to the mobile stations. In the embodiment of FIG. 2E, the base station is in both active sets of the two mobile stations shown as being serviced by the base station.

FIG. 2E shows a base station 200e that receives a plurality of power control signals formed from a plurality of mobile stations 100f of the form shown in FIG. 1F, and uses the power control signals to control the transmit power levels of first and second data streams transmitted to the mobile stations 100f. In the embodiment of FIG. 2E, base station 200e is in both active sets of the two mobile stations 100f shown as being serviced by the base station. Power control signals received from the mobile stations (MS1, . . . MSx) are provided to power control signal demodulation units 210, 214. Demodulation unit 210 demodulates an interleaved power control signal transmitted to base station 200e from a first mobile station (MS1), demodulation unit 214 demodulates an interleaved power control signal 110 transmitted to base station 200e from a second mobile station (MSx).

The output of demodulation unit 210 is provided to a demultiplexer 221 which deinterleaves the power control signal from the first mobile station (MS1) in order to extract a power control bit stream 250 representative of the stream of power control commands 172a transmitted to base station 200e from a first mobile station of the form 100f (as shown in FIG. 1F). The power control bit stream 250 is used to control the gain (or transmit power level) of transmitters 240, 242, which respectively transmit first and second different data streams 120, 120a back to the first mobile station (MS1). The output of demodulation unit 214 is provided to a demultiplexer 225 which deinterleaves the power control signal from a second mobile station of the form 100f (as shown in FIG. 1) in order to extract a power control bit stream 252 representative of a further stream of power control commands 172a transmitted to base station 200e from the second mobile station (MS2). The power control bit stream 252 is used to control the gain (or transmit power level) of transmitters 248, 249, which respectively transmit first and second different data streams back to the second mobile station (MS2). In one embodiment, each of the demodulation units 210,214 is configured to receive an interleaved power control signal on a different one of a plurality of power control subchannels, wherein each of the plurality of power control subchannels is associated with a different mobile station in the mobile radio communication system.

Figure 2F:
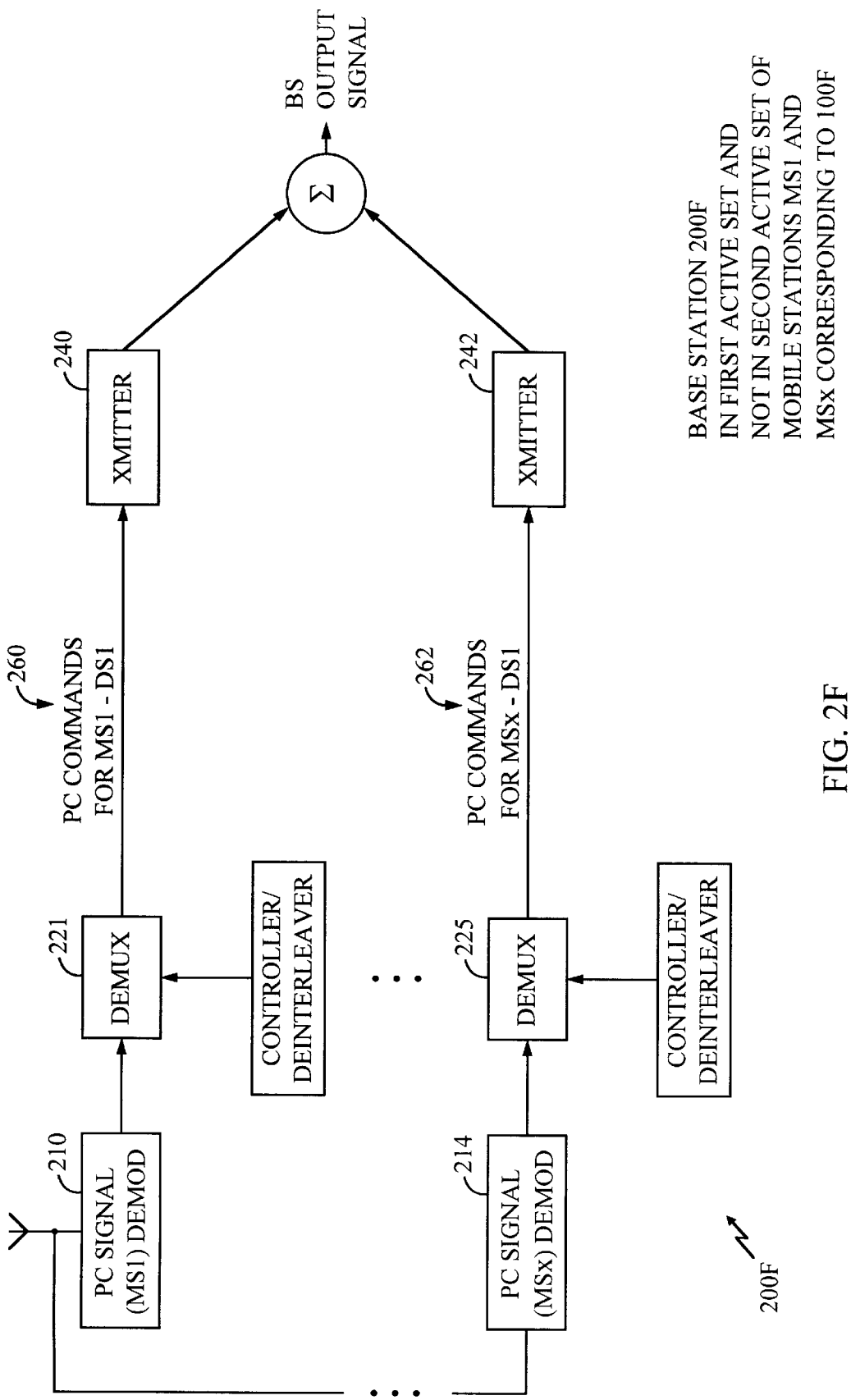
FIG. 2F shows a base station that receives a plurality of power control signals formed from a plurality of mobile stations of the form shown in FIG. 1F, and uses the power control signals to control the transmit power levels of first and second data streams transmitted to the mobile stations. In the embodiment of FIG. 2F, the base station is in the first active set and not the second active set of the two mobile stations shown as being serviced by the base station.

FIG. 2F shows a base station 200f that receives a plurality of power control signals formed from a plurality of mobile stations 100f of the form shown in FIG. 1F, and uses the power control signals to control the transmit power levels of first and second data streams transmitted to the mobile stations. In the embodiment of FIG. 2F, the base station 200f is in the first active set and not the second active set of the two mobile stations 100f shown as being serviced by the base station. Demodulation units 210, 214 and demultiplexers 221, 225 function substantially as discussed above in connection with FIG. 2E. However, power control bit stream 260 output by demultiplexer 221 is representative of the stream of power control commands 170a transmitted to base station 200e from a first mobile station of the form 100f (as shown in FIG. 1F). The power control bit stream 260 is used to control the gain (or transmit power level) of transmitter 240, which transmits the first data stream 122 back to the first mobile station (MS1). Similarly, power control bit stream 262 output by demultiplexer 225 is representative of a further stream of power control commands 172a transmitted to base station 200e from a second mobile station of the form 100f (as shown in FIG. 1F). The power control bit stream 262 is used to control the gain (or transmit power level) of transmitter 242, which transmits a first data stream back to a further mobile station (MSx).

Although power control signals from two mobile stations 100f are shown as being received by base stations 200e,200f it will be understood by those skilled in the art that base stations 200e, 200f could be configured to receive power control signals from more than (or less than) two different mobile stations.

Figure 2G:
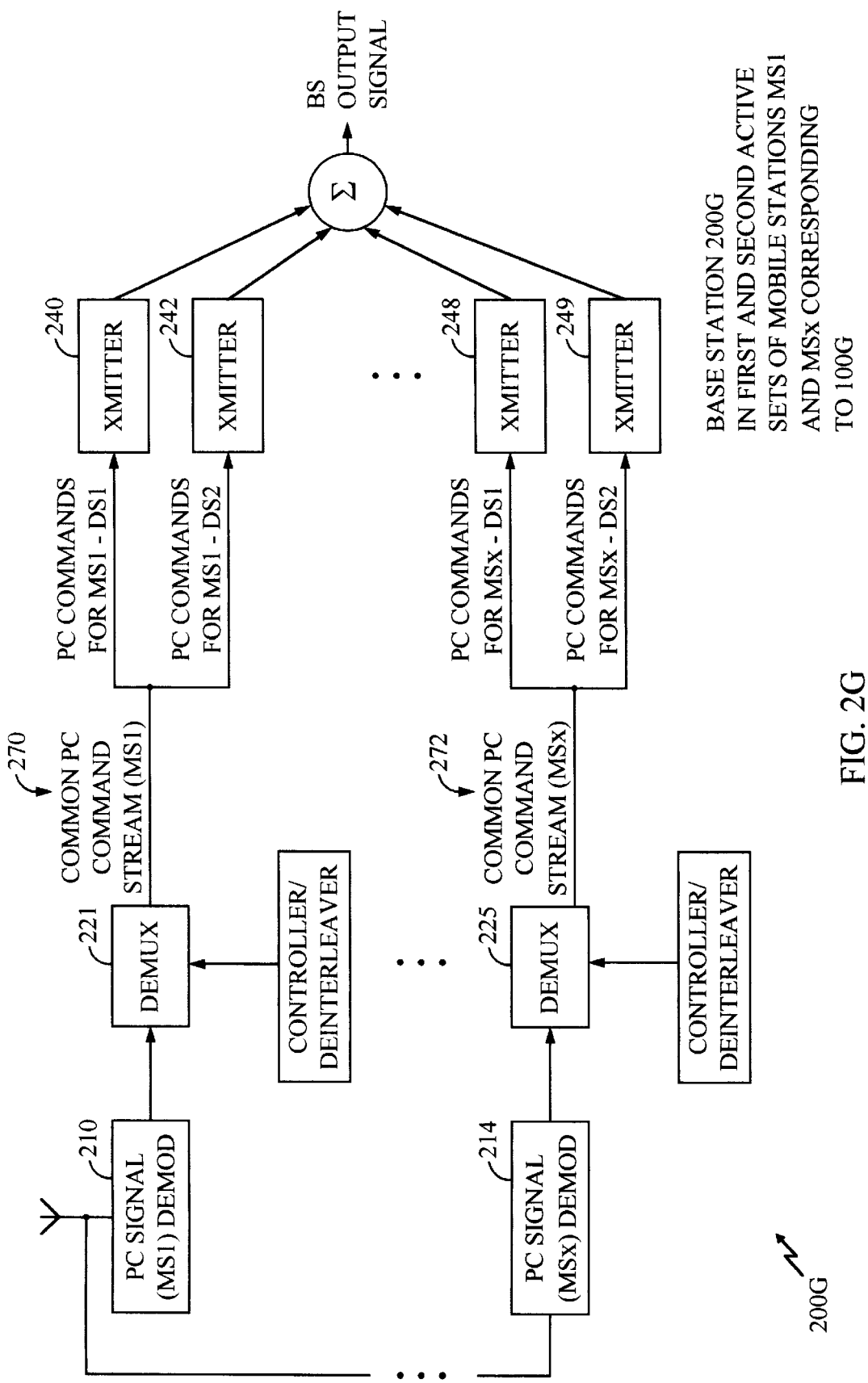
FIG. 2G shows a base station that receives a plurality of power control signals formed from a plurality of mobile stations of the form shown in FIG. 1G, and uses the power control signals to control the transmit power levels of first and second data streams transmitted to the mobile stations. In the embodiment of FIG. 2G, the base station is in both active sets of the two mobile stations shown as being serviced by the base station.

FIG. 2G shows a base station 200g that receives a plurality of power control signals formed from a plurality of mobile stations 200g of the form shown in FIG. 1G, and uses the power control signals to control the transmit power levels of first and second data streams transmitted to the mobile stations. In the embodiment of FIG. 2G, the base station 200g is in both active sets of the two mobile stations 100g shown as being serviced by the base station. Demodulation units 210, 214 and demultiplexers 221, 225 function substantially as discussed above in connection with FIG. 2E. However, power control bit stream 270 output by demultiplexer 221 is representative of the stream of power control commands 180a transmitted to base station 200g from a first mobile station of the form 100g (as shown in FIG. 1G). The power control bit stream 270 is used to control the gain (or transmit power level) of transmitters 240, 242 which transmits the first and second data streams back to the first mobile station (MS1). Similarly, power control bit stream 272 output by demultiplexer 225 is representative of a further stream of power control commands 180a transmitted to base station 200g from a second mobile station of the form 100g (as shown in FIG. 1G). The power control bit stream 272 is used to control the gain (or transmit power level) of transmitters 248, 249, which transmit first and second data streams back to a further mobile station (MSx).

Figure 2H:
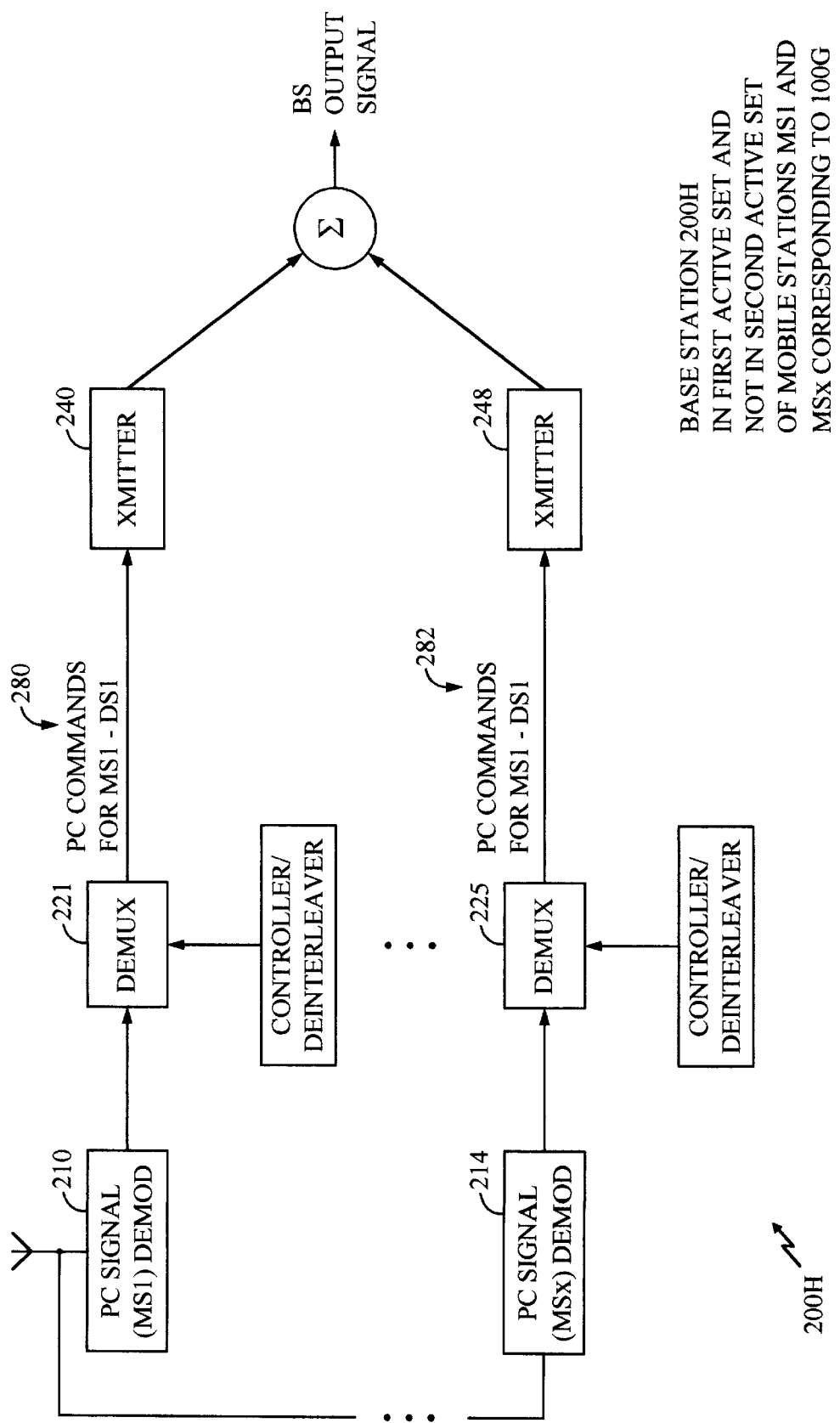
FIG. 2H shows a base station that receives a plurality of power control signals formed from a plurality of mobile stations of the form shown in FIG. 1G, and uses the power control signals to control the transmit power levels of first data streams transmitted to the mobile stations. In the embodiment of FIG. 2H, the base station is in the first active set and not the second active set of the two mobile stations shown as being serviced by the base station.

FIG. 2H shows a base station 200h that receives a plurality of power control signals formed from a plurality of mobile stations 100g of the form shown in FIG. 1G, and uses the power control signals to control the transmit power levels of first data streams transmitted to the mobile stations. In the embodiment of FIG. 2H, the base station 200h is in the first active set and not the second active set of the two mobile stations 100g shown as being serviced by the base station. Demodulation units 210, 214 and demutiplexers 221, 225 function substantially as discussed above in connection with FIG. 2E. However, power control bit stream 280 output by demultiplexer 221 is representative of the stream of power control commands 182a transmitted to base station 200h from a first mobile station of the form 100*g* (as shown in FIG. 1G). The power control bit stream 280 is used to control the gain (or transmit power level) of transmitter 240, which transmits the first data stream back to the first mobile station (MS1). Similarly, power control bit stream 282 output by demultiplexer 225 is representative of a further stream of power control commands 182*a* transmitted to base station 200*h* from a second mobile station of the form 100*g* (as shown in FIG. 1G). The power control bit stream 282 is used to control the gain (or transmit power level) of transmitter 248, which transmits a first data stream back to a further mobile station (MSx).

Although power control signals from two mobile stations 100*g* are shown as being received by base stations 200*g*, 200*h*, it will be understood by those skilled in the art that base stations 200*g*, 200*h* could be configured to receive power control signals from more than (or less than) two different mobile stations.

Figure 2I:
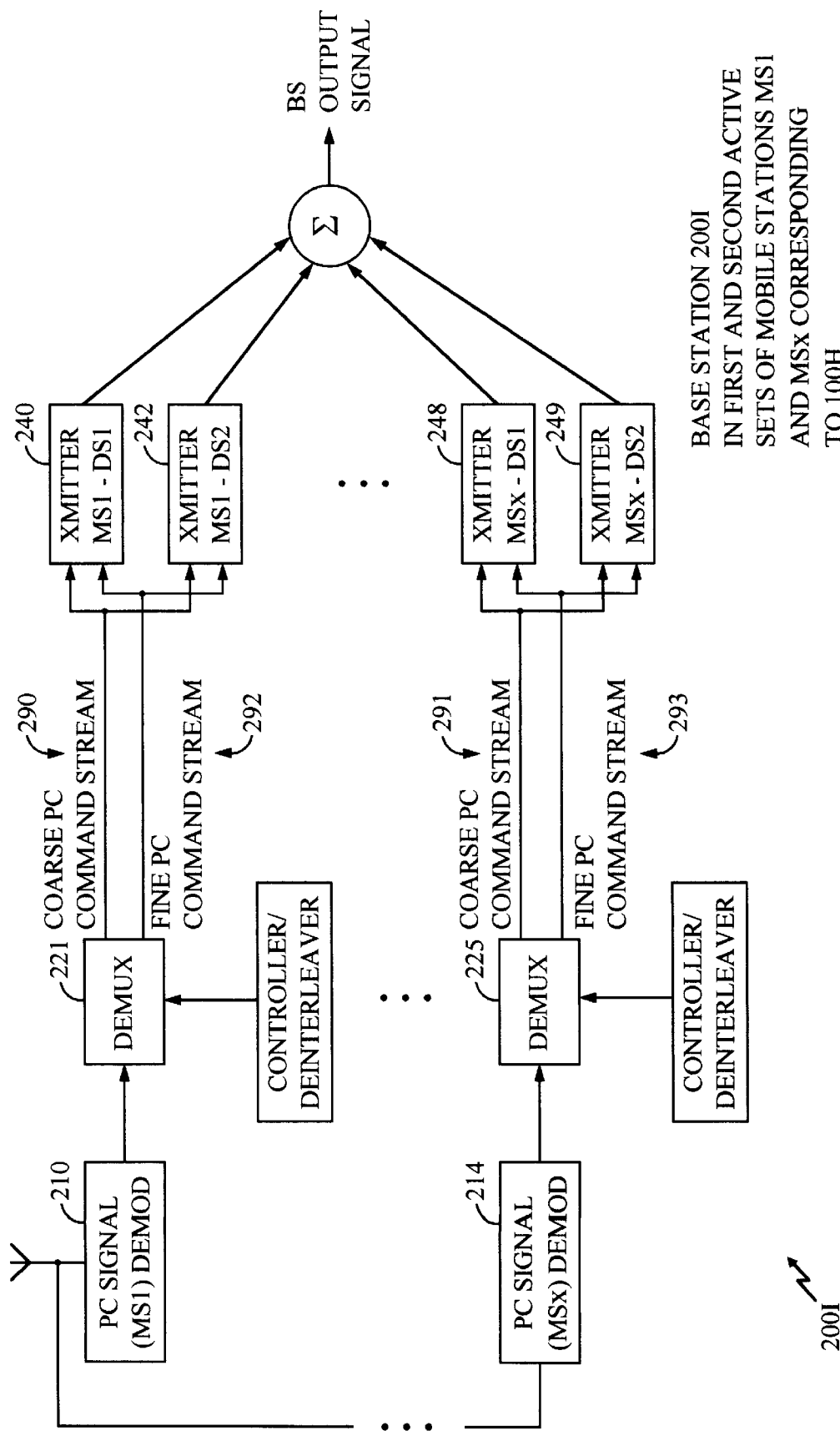
FIG. 2I shows a base station that receives coarse and fine power control signals formed from a plurality of mobile stations of the form shown in FIG. 1H, and uses the power control signals to control the transmit power levels of first and second data streams transmitted to the mobile stations. In the embodiment of FIG. 2I, the base station is in both active sets of the two mobile stations shown as being serviced by the base station.

FIG. 2I shows a base station 200*i* that receives coarse and fine power control signals formed from a plurality of mobile stations 100*h* of the form shown in FIG. 1H, and uses the power control signals to control the transmit power levels of first and second data streams transmitted to the mobile stations. In the embodiment of FIG. 2I, the base station 200I is in both active sets of the two mobile stations shown as being serviced by the base station. Demodulation units 210, 214 and demultiplexers 221, 225 function substantially as discussed above in connection with FIG. 2E. However, coarse power control bit stream 290 output by demultiplexer 221 is representative of the stream of coarse power control commands 184*a* transmitted to base station 200*i* from a first mobile station of the form 100*h* (as shown in FIG. 1H), and fine power control bit stream 292 output by demultiplexer 221 is representative of the stream of fine power control commands 186*a* transmitted to base station 200*i* from a first mobile station of the form 100*h* (as shown in FIG. 1H). The coarse and fine power control bit streams 290, 292 are used to control the gain (or transmit power level) of transmitters 240, 242 which transmit the first and second data streams back to the first mobile station (MS1). Similarly, coarse power control bit stream 291 output by demultiplexer 225 is representative of a further stream of coarse power control commands 184*a* transmitted to base station 200*i* from a second mobile station of the form 100*h* (as shown in FIG. 1H), and fine power control bit stream 293 output by demultiplexer 221 is representative of a further stream of fine power control commands 186*a* transmitted to base station 200*i* from a second mobile station of the form 100*h* (as shown in FIG. 1H). The coarse and fine power control bit streams 291, 293 are used to control the gain (or transmit power level) of transmitters 248, 249 which transmit first and second data streams back to a further mobile station (MSx).

Figure 2J:
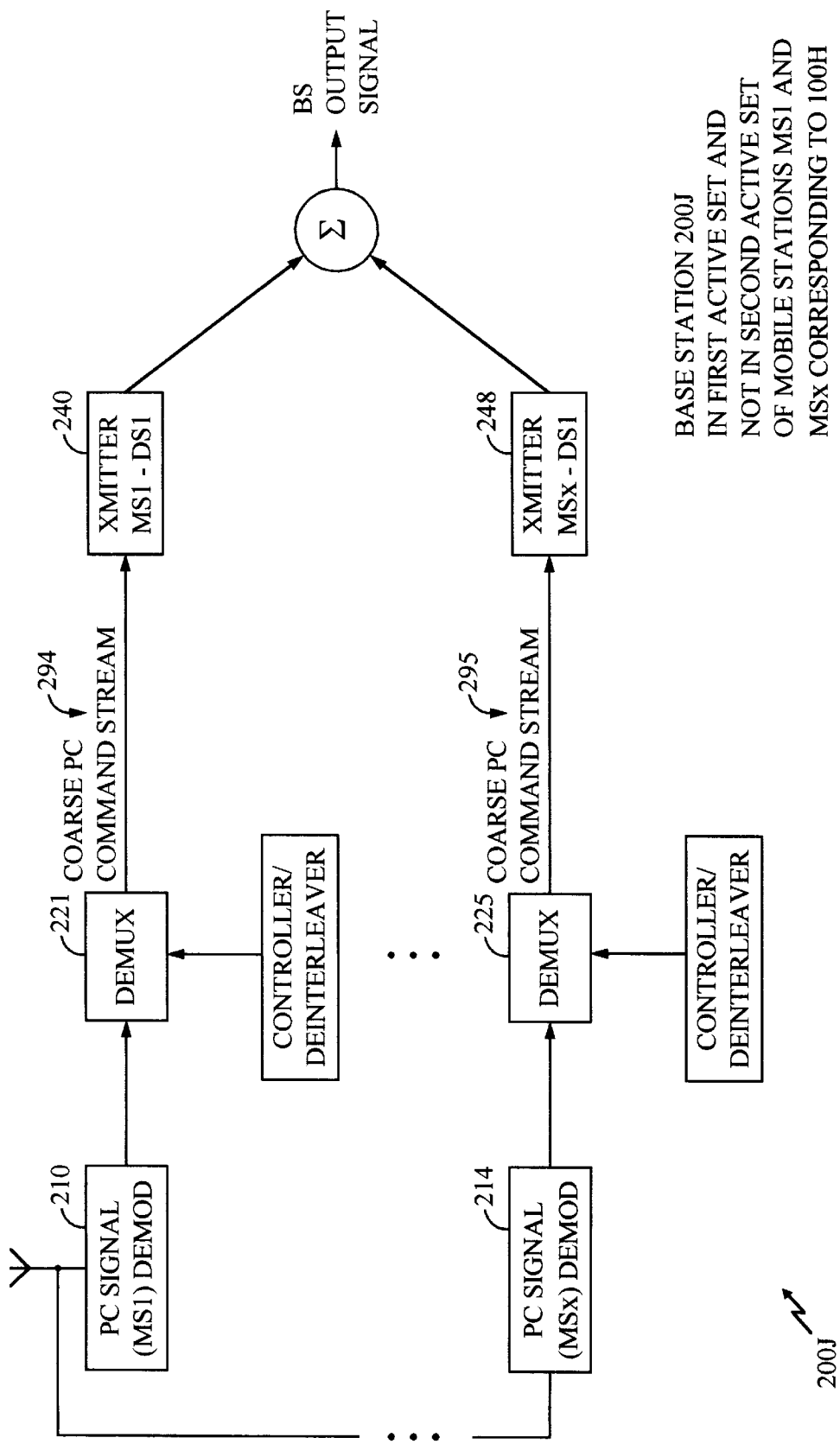
FIG. 2J shows a base station that receives coarse power control signals formed from a plurality of mobile stations of the form shown in FIG. 1H, and uses the power control signals to control the transmit power levels of first data streams transmitted to the mobile stations. In the embodiment of FIG. 2H, the base station is in the first active set and not the second active set of the two mobile stations shown as being serviced by the base station.

FIG. 2J shows a base station 200*j* that receives coarse power control signals formed from a plurality of mobile stations 100*h* of the form shown in FIG. 1H, and uses the power control signals to control the transmit power levels of first data streams transmitted to the mobile stations. In the embodiment of FIG. 2H, the base station 200*j* is in the first active set and not the second active set of the two mobile stations shown as being serviced by the base station. Demodulation units 210, 214 and demultiplexers 221, 225 function substantially as discussed above in connection with FIG. 2E. However, coarse power control bit stream 294 output by demultiplexer 221 is representative of the stream of coarse power control commands 184*a* transmitted to base station 200*j* from a first mobile station of the form 100*h* (as shown in FIG. 1H), Only the coarse (and not the fine) power control bit stream 294 is used to control the gain (or transmit power level) of transmitter 240, which transmits the first data stream back to the first mobile station (MS1). Similarly, coarse power control bit stream 295 output by demultiplexer 225 is representative of a further stream of coarse power control commands 184*a* transmitted to base station 200*j* from a second mobile station of the form 100*h* (as shown in FIG. 1H). Only the coarse (and not the fine) power control bit stream 295 is used to control the gain (or transmit power level) of transmitter 248, which transmit a first data stream back to a further mobile station (MSx).

Although power control signals from two mobile stations 100*h* are shown as being received by base stations 200*i*, 200*j*, it will be understood by those skilled in the art that base stations 200*i*, 200*j* could be configured to receive power control signals from more than (or less than) two different mobile stations.

Figure 2K:
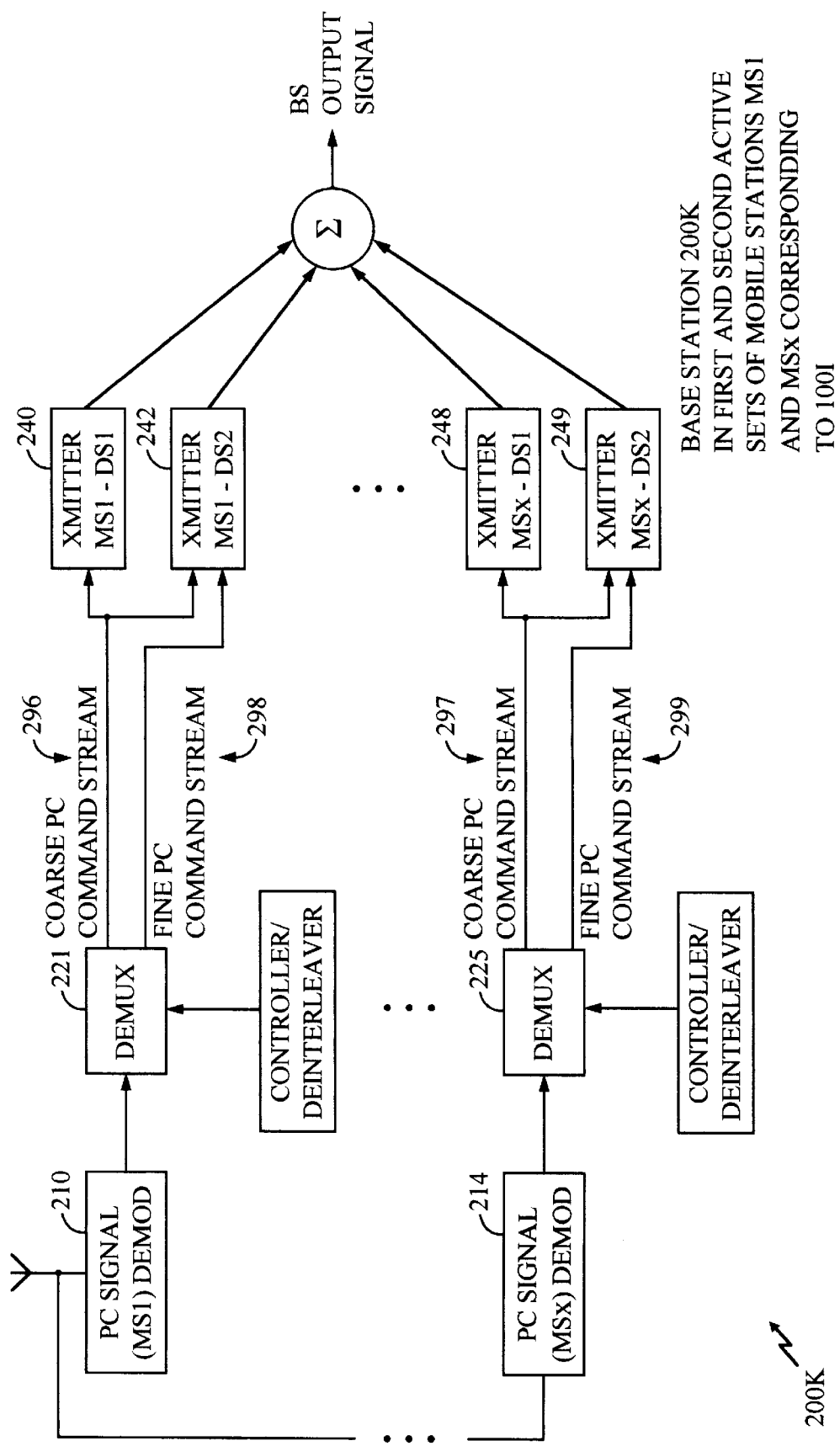
FIG. 2K shows a base station that receives coarse and fine power control signals formed from a plurality of mobile stations of the form shown in FIG. 1I, and uses the power control signals to control the transmit power levels of first and second data streams transmitted to the mobile stations. In the embodiment of FIG. 2K, the base station is in both active sets of the two mobile stations shown as being serviced by the base station.

FIG. 2K shows a base station 200*k* that receives coarse and fine power control signals formed from a plurality of mobile stations 100*i* of the form shown in FIG. 1I, and uses the power control signals to control the transmit power levels of first and second data streams transmitted to the mobile stations. In the embodiment of FIG. 2K, the base station 200*k* is in both active sets of the two mobile stations shown as being serviced by the base station. Demodulation units 210, 214 and demultiplexers 221, 225 function substantially as discussed above in connection with FIG. 2E. However, coarse power control bit stream 296 output by demultiplexer 221 is representative of the stream of coarse power control commands 188*a* transmitted to base station 200*k* from a first mobile station of the form 100*i* (as shown in FIG. 1I), and fine power control bit stream 298 output by demultiplexer 221 is representative of the stream of fine power control commands 188*b* transmitted to base station 200*k* from a first mobile station of the form 100*i* (as shown in FIG. 1H). Only the coarse power control bit stream 296 is used to control the gain (or transmit power level) of transmitter 240, which transmits the first data stream back to the first mobile station (MS1). The coarse and fine power control bit streams 296, 298 are used in combination to control the gain (or transmit power level) of transmitter 242, which transmits the second data stream back to the first mobile station (MS1). Coarse power control bit stream 297 output by demultiplexer 225 is representative of the stream of coarse power control commands 188*a* transmitted to base station 200*k* from a further mobile station of the form 100*i* (as shown in FIG. 1I), and fine power control bit stream 299 output by demultiplexer 225 is representative of the stream of fine power control commands 188*b* transmitted to base station 200*k* from a further mobile station of the form 100*i* (as shown in FIG. 1H). Only the coarse power control bit stream 297 is used to control the gain (or transmit power level) of transmitter 248, which transmits a first data stream back to the further mobile station (MSx). The coarse and fine power control bit streams 297, 299 are used in combination to control the gain (or transmit power level) of transmitter 249, which transmits a second data stream back to the further mobile station (MSx).

Figure 2L:
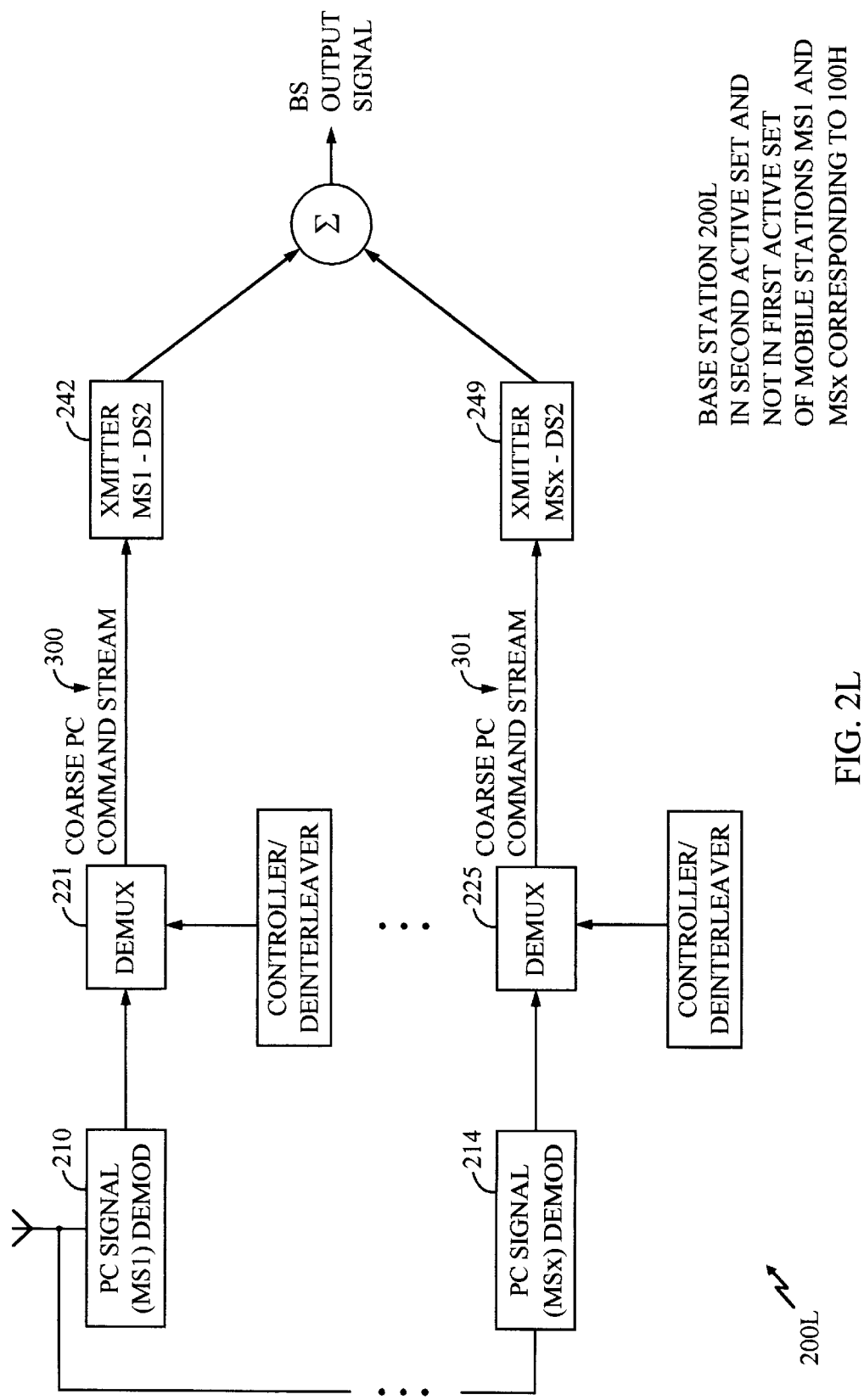
FIG. 2L shows a base station that receives coarse power control signals formed from a plurality of mobile stations of the form shown in FIG. 1I, and uses the power control signals to control the transmit power levels of first data streams transmitted to the mobile stations. In the embodiment of FIG. 2L, the base station is in the second active set and not the first active set of the two mobile stations shown as being serviced by the base station.

FIG. 2L shows a base station 200*l* that receives coarse power control signals formed from a plurality of mobile stations 200*i* of the form shown in FIG. 1I, and uses the power control signals to control the transmit power levels of first data streams transmitted to the mobile stations. In the embodiment of FIG. 2L, the base station 200*l* is in the second active set and not the first active set of the two mobile stations shown as being serviced by the base station.

Demodulation units 210, 214 and demutiplexers 221, 225 function substantially as discussed above in connection with FIG. 2E. However, coarse power control bit stream 300 output by demultiplexer 221 is representative of the stream of coarse power control commands 188a transmitted to base station 200l from a first mobile station of the form 100i (as shown in FIG. 1I). Only the coarse power control bit stream 300 is used to control the gain (or transmit power level) of transmitter 242, which transmits the second data stream back to the first mobile station (MS1). Coarse power control bit stream 301 output by demultiplexer 225 is representative of the stream of coarse power control commands 188a transmitted to base station 200l from a further mobile station of the form 100i (as shown in FIG. 1I). Only the coarse power control bit stream 301 is used to control the gain (or transmit power level) of transmitter 249, which transmits a second data stream back to the further mobile station (MSx).

Although power control signals from two mobile stations 100i are shown as being received by base stations 200k, 200l, it will be understood by those skilled in the art that base stations 200k, 200l could be configured to receive power control signals from more than (or less than) two different mobile stations.

Transmission of the interleaved power control signals 110 from a mobile station to base stations operating in accordance with the present invention can be performed by way of a power control channel or a power control subchannel as described above. Each interleaved power control signal 110 transmitted to a base station by way of a power control subchannel can, for example, be a conventional 800 bits per second closed loop power control signal. The interleaving performed by units 146, 148 can be performed by a puncturing method well understood by those skill in the art. In one example, an interleaved power control signal 110 is formed using mobile station 100 (FIG. 1A) by interleaving two bits of power control information for each of signals 120, 122 and 124 with four bits of power control information for each of signals 120a, 122a and 124a. This is followed by another two bits of power control information for each of signals 120, 122 and 124 and another four bits of power control information for each of signals 120a, 122a and 124a, and so on. By varying the number of power control bits allocated to each signal during the interleaving process, the bit rate within interleaved signal 110 of the power control bit streams corresponding to the signals 120, 122, 124 can be made smaller than that of the power control bit streams corresponding to signals 120a, 122a, 124a. The bit rates of the power control bit streams included in the interleaved signal 110 can also be shifted dynamically based on fading conditions.

The previous description of the preferred embodiments is provided to enable a person skilled in the art to make and use the present invention. The various modifications to these embodiments will be readily apparent to those skilled in the art, and the generic principles defined herein can be applied to other embodiments without the use of the inventive faculty. Thus, the present invention is not intended to be limited to the embodiments shown herein but is to be accorded the widest scope consistent with the principles and novel features disclosed.

What is claimed is:

1. In a mobile radio telephone communication system, a method for controlling transmit power levels of a plurality of different data streams transmitted from at least one base station to a mobile station, comprising the steps of:

(a) transmitting a first data stream from the at least one base station to the mobile station, and transmitting a second data stream from the at least one base station to the mobile station;

(b) receiving the first and second data streams at the mobile station;

(c) forming a first stream of power control commands at the mobile station in accordance with either the first or second received data stream;

(d) forming a power control signal at the mobile station from the first stream of power control commands;

(e) transmitting the power control signal from the mobile station to the at least one base station;

(f) receiving the power control signal at the at least one base station;

(g) forming a first received stream of power control commands from the received power control signal at the at least one base station; and (h) controlling a transmit power level of the first data stream from the at least base station in accordance with the first received stream of power control commands, and controlling a transmit power level of the second data stream from the at least one base station in accordance with the first received stream of power control commands.

2. The method of claim 1, wherein the radio telephone communication system includes first and second base stations, and step (a) comprises:

(a) transmitting the first data stream from the first and second base stations to the mobile station, and transmitting the second data stream from the second base station to the mobile station;

step (b) comprises:

(b) receiving, at the mobile station, the first data stream from the first base station and from the second base station, and receiving the second data stream from the second base station at the mobile station;

step (c) comprises:

(c) forming a first stream of power control commands at the mobile station, wherein the first stream of power control commands is determined in accordance with one of the first or second data streams received from the first base station, and forming a second stream of power control commands at the mobile station, wherein the second stream of power control commands is determined in accordance with the second data stream received from the second base station;

step (d) comprises:

(d) forming an interleaved power control signal at the mobile station by interleaving the first and second streams of power control commands;

step (e) comprises:

(e) transmitting the interleaved power control signal from the mobile station to the first and second base stations;

step (f) comprises:

(f) receiving the interleaved power control signal at the first and second base station;

step (g) comprises:

(g) forming a first received stream of power control commands at the first base by deinterleaving the received interleaved power control signal, and forming a second received stream of power control commands at the second base station by deinterleaving the received interleaved power control signal; and step (h) comprises:

(h) controlling the transmit power level of the first data stream transmitted from the first base station in accordance with the first received stream of power control commands, controlling the transmit power level of the second data stream transmitted from the first base station in accordance with the first received stream of power control commands, controlling a transmit power level of the second data stream transmitted from the second base station in accordance with the second received stream of power control commands.

3. The method of claim 1, wherein the radio telephone communication system includes first and second base stations, and step (a) comprises:

(a) transmitting the first data stream from the first and second base stations to the mobile station, and transmitting the second data stream from the first and second base stations to the mobile station;

step (b) comprises:

(b) receiving, at the mobile station, the first data stream from the first base station and from the second base station, and receiving, at the mobile station, the second data stream from the first base station and from the second base station;

step (c) comprises:

(c) forming a first stream of power control commands at the mobile station, wherein the first stream of power control commands is determined in accordance with one of the first or second data streams received from the first base station, and forming a second stream of power control commands at the mobile station, wherein the second stream of power control commands is determined in accordance with one of the first or second data streams received from the second base station;

step (d) comprises:

(d) forming an interleaved power control signal at the mobile station by interleaving the first and second streams of power control commands;

step (e) comprises:

(e) transmitting the interleaved power control signal from the mobile station to the first and second base stations;

step (f) comprises:

(f) receiving the interleaved power control signal at the first and second base station;

step (g) comprises:

(g) forming a first received stream of power control commands at the first base by deinterleaving the received interleaved power control signal, and forming a second received stream of power control commands at the second base station by deinterleaving the received interleaved power control signal; and step (h) comprises:

(h) controlling the transmit power level of the first data stream transmitted from the first base station in accordance with the first received stream of power control commands, controlling the transmit power level of the second data stream transmitted from the first base station in accordance with the first received stream of power control commands, controlling the transmit power level of the first data stream transmitted from the second base station in accordance with the second received stream of power control commands, and controlling the transmit power level of the second data stream transmitted from the second base station in accordance with the second received stream of power control commands.

4. The method of claim 3, wherein the first received stream of power control commands corresponds substantially to the first stream of power control commands determined in step (c).

5. The method of claim 4, wherein the second received stream of power control commands corresponds substantially to the second stream of power control commands determined in step (c).

6. The method of claim 1, wherein the radio telephone communication system includes a first set of two or more bases stations, and the first set of base stations includes at least first and second base stations, and step (a) comprises:

(a) transmitting the first data stream from each base station in the first set of base stations to the mobile station, and transmitting the second data stream from the second base station to the mobile station;

step (b) comprises:

(b) receiving the first data stream from each base station in the first set of base stations at the mobile station, and receiving the second data stream from the second base station at the mobile station;

step (c) comprises:

(c) forming a first plurality of streams of power control commands at the mobile station, wherein each stream of power control commands in the first plurality of streams of power control commands is associated with one of the base stations in the first set of base stations, wherein each stream of power control commands in the first plurality other than the power control stream associated with the second base station is determined in accordance with the first data stream received from one of the base stations in the first set of base stations, and wherein the stream of power control commands in the first plurality associated with the second base station is determined in accordance with one of the first or second data streams received from the second base station;

step (d) comprises:

(d) forming an interleaved power control signal at the mobile station by interleaving the first plurality of streams of power control commands;

step (e) comprises:

(e) transmitting the interleaved power control signal from the mobile station to the base stations in the first set of base stations;

step (f) comprises:

(f) receiving the interleaved power control signal at the base stations in the first set of base stations;

step (g) comprises:

(g) forming a first plurality of received streams of power control commands, wherein each of the received streams of power control commands in the first plurality is formed at a different one of the base stations in the first set of base stations by deinterleaving the received interleaved power control signal, and the first plurality includes a received stream of power control commands associated with the second base station; and step (h) comprises:

(h) controlling the transmit power level of the first data stream transmitted from each base station in the first set of base stations other than the second base station in accordance with a corresponding one of the first plurality of received streams of power control commands, and controlling the transmit power level of the first and second data streams transmitted from the second base station in accordance with the received stream of power control commands associated with the second base station.

7. The method of claim 1, wherein the first data stream is a voice message signal.

8. The method of claim 7, wherein the second data stream represents a fax transmission.

9. The method of claim 7, wherein the second data stream represents an internet transmission.

10. The method of claim 1, wherein the mobile station forms the first stream of power control commands in step (c) by monitoring an error rate associated with either the first or second received data stream.

11. The method of claim 1, wherein the mobile station forms the first stream of power control commands in step (c) by monitoring a signal-to-noise ratio associated with either the first or second received data stream.

12. The method of claim 1, wherein each of the power control commands in the first stream of power control commands represents a command to either increase or decrease transmit power associated with the first or second data streams transmitted in step (a).

13. The method of claim 1, wherein the first and second data streams are transmitted to the mobile station in step (a) on a common frequency band.

14. The method of claim 13, wherein the first and second data streams are transmitted to the mobile station using code division multiple access modulation.

15. The method of claim 2, wherein the first stream of power control commands has a first bit rate within the interleaved power control signal and the second stream of power control commands has a second bit rate within the interleaved power control signal.

16. The method of claim 3, wherein the first stream of power control commands has a first bit rate within the interleaved power control signal and the second stream of power control commands has a second bit rate within the interleaved power control signal.

17. The method of claim 2, wherein the mobile station is in a soft handoff between the first and second base stations while steps (a)–(h) are being performed.

18. The method of claim 3, wherein the mobile station is in a soft handoff between the first and second base stations while steps (a)–(h) are being performed.

19. In a mobile radio telephone communication system, a method for controlling transmit power levels of a plurality of different data streams transmitted from at least one base station to a mobile station, comprising the steps of:
(a) transmitting a first data stream from the at least one base station to the mobile station, and transmitting a second data stream from the at least one base station to the mobile station;
(b) receiving the first and second data streams at the mobile station;
(c) forming a first stream of power control commands at the mobile station in accordance with the first received data stream, and forming a second stream of power control commands at mobile station in accordance with the second received data stream;
(d) forming a power control signal at the mobile station by interleaving the first and second streams of power control commands;
(e) transmitting the interleaved power control signal from the mobile station to the at least one base station;
(f) receiving the interleaved power control signal at the at least one base station;
(g) forming first and second received streams of power control commands by deinterleaving the received power control signal at the at least one base station; and
(h) controlling a transmit power level of the first data stream from the at least base station in accordance with the first received stream of power control commands, and controlling a transmit power level of the second data stream from the at least one base station in accordance with the second received stream of power control commands.

20. The method of claim 19, wherein the radio telephone communication system includes first and second base stations, and step (a) comprises:
(a) transmitting the first data stream from the first and second base stations to the mobile station, and transmitting the second data stream from the second base station to the mobile station;
step (b) comprises:
(b) receiving, at the mobile station, the first data stream from the first base station and from the second base station, and receiving the second data stream from the second base station at the mobile station;
step (c) comprises:
(c) forming first and second streams of power control commands at the mobile station, wherein the first stream of power control commands is determined in accordance with the first data stream received from the first base station and the second stream of power control commands is determined in accordance with the first data stream received from the second base station, and forming a third stream of power control commands at the mobile station, wherein the third stream of power control commands is determined in accordance with the second data stream received from the second base station;
step (d) comprises:
(d) forming an interleaved power control signal at the mobile station by interleaving the first, second and third streams of power control commands;
step (e) comprises:
(e) transmitting the interleaved power control signal from the mobile station to the first and second base stations;
step (f) comprises:
(f) receiving the interleaved power control signal at the first and second base station;
step (g) comprises:
(g) forming first and second received streams of power control commands at the first base by deinterleaving the received interleaved power control signal, and forming a third received stream of power control commands at the second base station by deinterleaving the received interleaved power control signal; and
step (h) comprises:
(h) controlling the transmit power level of the first data stream transmitted from the first base station in accordance with the first received stream of power control commands, controlling the transmit power level of the second data stream transmitted from the first base station in accordance with the second received stream of power control commands, controlling a transmit power level of the second data stream transmitted from the second base station in accordance with the third received stream of power control commands.

21. The method of claim 19, wherein the radio telephone communication system includes first and second base stations, and step (a) comprises:
(a) transmitting the first data stream from the first and second base stations to the mobile station, and transmitting the second data stream from the first and second base stations to the mobile station;
step (b) comprises:

(b) receiving, at the mobile station, the first data stream from the first base station and from the second base station, and receiving, at the mobile station, the second data stream from the first base station and from the second base station;

step (c) comprises:

(c) forming first and second streams of power control commands at the mobile station, wherein the first stream of power control commands is determined in accordance with the first data stream received from the first base station and the second stream of power control commands is determined in accordance with the first data stream received from the second base station, and forming third and fourth streams of power control commands at the mobile station, wherein the third stream of power control commands is determined in accordance with the second data stream received from the first base station and the fourth stream of power control commands is determined in accordance with the second data stream received from the second base station;

step (d) comprises:

(d) forming an interleaved power control signal at the mobile station by interleaving the first, second, third and fourth streams of power control commands;

step (e) comprises:

(e) transmitting the interleaved power control signal from the mobile station to the first and second base stations;

step (f) comprises:

(f) receiving the interleaved power control signal at the first and second base station;

step (g) comprises:

(g) forming first and second received streams of power control commands at the first base by deinterleaving the received interleaved power control signal, and forming third and fourth received streams of power control commands at the second base station by deinterleaving the received interleaved power control signal; and step (h) comprises:

(h) controlling the transmit power level of the first data stream transmitted from the first base station in accordance with the first received stream of power control commands, controlling the transmit power level of the second data stream transmitted from the first base station in accordance with the second received stream of power control commands, controlling the transmit power level of the first data stream transmitted from the second base station in accordance with the third received stream of power control commands, and controlling the transmit power level of the second data stream transmitted from the second base station in accordance with the fourth received stream of power control commands.

22. The method of claim 19, wherein the radio telephone communication system includes a first set of two or more bases stations, and the first set of base stations includes at least first and second base stations, and step (a) comprises:

(a) transmitting the first data stream from each base station in the first set of base stations to the mobile station, and transmitting the second data stream from the second base station to the mobile station;

step (b) comprises:

(b) receiving the first data stream from each base station in the first set of base stations at the mobile station, and receiving the second data stream from the second base station at the mobile station;

step (c) comprises:

(c) forming a first plurality of streams of power control commands at the mobile station, wherein each stream of power control commands in the first plurality is determined in accordance with the first data stream received from one of the base stations in the first set of base stations, and forming a further stream of power control commands at the mobile station, wherein the further stream of power control commands is determined in accordance with the second data stream received from the second base station;

step (d) comprises:

(d) forming an interleaved power control signal at the mobile station by interleaving the first plurality of streams of power control commands and the further stream of power control commands;

step (e) comprises:

(e) transmitting the interleaved power control signal from the mobile station to the base stations in the first set of base stations;

step (f) comprises:

(f) receiving the interleaved power control signal at the base stations in the first set of base stations;

step (g) comprises:

(g) forming a first plurality of received streams of power control commands, wherein each of the received streams of power control commands in the first plurality is formed at a different one of the base stations in the first set of base stations by deinterleaving the received interleaved power control signal, and forming a further received stream of power control commands, wherein the further received stream of power control commands is formed at the second base station by deinterleaving the received interleaved power control signal; and step (h) comprises:

(h) controlling the transmit power level of the first data stream transmitted from each base station in the first set of base stations in accordance with a corresponding one of the first plurality of received streams of power control commands, and controlling the transmit power level of the second data stream transmitted from the second base station in accordance with the further received stream of power control commands.

23. The method of claim 22, wherein the radio telephone communication system includes a second set of two or more bases stations, and the second set of base stations is a subset of the first set of base stations, and step (a) comprises:

(a) transmitting the first data stream from the first set of base stations to the mobile station, and transmitting the second data stream from the second set of base stations to the mobile station;

step (b) comprises:

(b) receiving the first data stream from each base station in the first set of base stations at the mobile station, and receiving the second data stream from each base station in the second set of base stations at the mobile station;

step (c) comprises:

(c) forming a first plurality of streams of power control commands at the mobile station, wherein each stream of power control commands in the first plurality is determined in accordance with the first data stream received from one of the base stations in the first set of base stations, and forming a second plurality of streams of power control commands at the mobile station, wherein each stream of power control commands in the second plurality is determined in accordance with the second data stream received from one of the base stations in the second set of base stations;

step (d) comprises:
- (d) forming an interleaved power control signal at the mobile station by interleaving the first plurality of streams of power control commands and the second plurality of streams of power control commands;

step (e) comprises:
- (e) transmitting the interleaved power control signal from the mobile station to the base stations in the first set of base stations;

step (f) comprises:
- (f) receiving the interleaved power control signal at the base stations in the first set of base stations;

step (g) comprises:
- (g) forming a first plurality of received streams of power control commands, wherein each of the received streams of power control commands in the first plurality is formed at a different one of the base stations in the first set of base stations by deinterleaving the received interleaved power control signal, and forming a second plurality of received streams of power control commands, wherein each of the received streams of power control commands in the second plurality is formed at a different one of the base stations in the second set of base stations by deinterleaving the received interleaved power control signal; and step (h) comprises:
- (h) controlling the transmit power level of the first data stream transmitted from each base station in the first set of base stations in accordance with a corresponding one of the first plurality of received streams of power control commands, and controlling the transmit power level of the second data stream transmitted from each base station in the second set of base stations in accordance with a corresponding one of the second plurality of received streams of power control commands.

24. In a mobile radio telephone communication system, a method for controlling transmit power levels of a plurality of different data streams transmitted from at least first and second base stations to a mobile station, comprising the steps of:

- (a) transmitting a first data stream from the first and second base stations to the mobile station, and transmitting a second data stream from the first base station to the mobile station;
- (b) receiving, at the mobile station, the first data stream from the first base station and from the second base station, and receiving the second data stream from the first base station at the mobile station;
- (c) forming a first stream of power control commands at the mobile station, wherein the first stream of power control commands is determined in accordance with the first data stream received from the first base station and the first data stream received from the second base station, and forming a second stream of power control commands at the mobile station, wherein the second stream of power control commands is determined in accordance with the second data stream received from the first base station;
- (d) forming a power control signal at the mobile station from the first stream of power control commands and the second stream of power control commands;
- (e) transmitting the power control signal from the mobile station to the first base station;
- (f) receiving the power control signal at the first base station;
- (g) forming a first received stream of power control commands and a second received stream of power control commands from the received power control signal at the first base station; and
- (h) controlling a transmit power level of the first data stream from the first base station in accordance with the first received stream of power control commands, and controlling a transmit power level of the second data stream from the first base station in accordance with the second received stream of power control commands.

25. The method of claim 24, wherein the first received stream of power control commands corresponds substantially to the first stream of power control commands determined in step (c), and the second received stream of power control commands corresponds substantially to the second stream of power control commands determined in step (c).

26. The method of claim 24, wherein step (c) further comprises forming a third stream of power control commands at the mobile station that is different from the first stream of power control commands, the third stream of power control commands being determined in accordance with the first data stream received from the first base station and the first data stream received from the second base station; step (d) further comprises forming a second power control signal at the mobile station from the first stream of power control commands, the second stream of power control commands and the third stream of power control commands; step (e) further comprises transmitting the power control signal from the mobile station to the second base station; step (f) further comprises receiving the power control signal at the second base station; step (g) further comprises forming a third received stream of power control commands from the received power control signal at the second base station; and step (h) further comprises controlling a transmit power level of the first data stream from the second base station in accordance with the third received stream of power control commands.

27. The method of claim 24, wherein step (a) comprises:
- (a) transmitting a first data stream from a first active set of three or more base stations to the mobile station, and transmitting a second data stream from a second active set of one or more base stations to the mobile station, wherein the first and second base stations are both included in the first active set of base stations, and the first base station is included in the second active set of base stations;

step (b) comprises:
- (b) receiving, at the mobile station, the first data stream from each base station in the first active set of base stations, and receiving the second data stream from each base station in the second set of base stations at the mobile station; and step (c) comprises:
- (c) forming a first stream of power control commands at the mobile station, wherein the first stream of power control commands is determined in accordance with the first data stream received from each base station in the first active set of base stations, and forming a second stream of power control commands at the mobile station, wherein the second stream of power control commands is determined in accordance with the second data stream received from the second active set of base stations.

28. The method of claim 27, wherein the second active set of base stations is a subset of the first active set of base stations.

29. The method of claim 24, wherein the first data stream is a voice message signal.

30. The method of claim 29, wherein the second data stream represents a fax transmission.

31. The method of claim 29, wherein the second data stream represents an internet transmission.

32. The method of claim 24, wherein the mobile station forms the first stream of power control commands in step (c) by monitoring an error rate associated with the first received data stream from the first base station and an error rate associated with the first received data stream from the second base station.

33. The method of claim 24, wherein the mobile station forms the first stream of power control commands in step (c) by monitoring an error rate associated with the first received data stream from the first base station and an error rate associated with the first received data stream from the second base station.

34. The method of claim 24, wherein the mobile station forms the first stream of power control commands in step (c) by monitoring a signalto-noise ratio associated with the first received data stream from the first base station and a signal-to-noise ratio associated with the first received data stream from the second base station.

35. The method of claim 24, wherein each of the power control commands in the first stream of power control commands represents a command to either increase or decrease transmit power associated with the first data stream transmitted from the first base station in step (a).

36. The method of claim 35, wherein each of the power control commands in the second stream of power control commands represents a command to either increase or decrease transmit power associated with the second data stream transmitted from the first base station in step (a).

37. The method of claim 26, wherein each of the power control commands in the third stream of power control commands represents a command to either increase or decrease transmit power associated with the first data stream transmitted from the second base station in step (a).

38. The method of claim 24, wherein the first and second data streams are transmitted to the mobile station in step (a) on a common frequency band.

39. The method of claim 38, wherein the first and second data streams are transmitted to the mobile station using code division multiple access modulation.

40. The method of claim 24, wherein the mobile station is in a soft handoff between the first and second base stations while steps (a)–(h) are being performed.

41. The method of claim 26, wherein the mobile station is in a soft handoff between the first and second base stations while steps (a)–(h) are being performed.

42. The method of claim 27, wherein the mobile station is in a soft handoff between the first and second base stations while steps (a)–(h) are being performed.

43. In a mobile radio telephone communication system, a method for controlling transmit power levels of a plurality of different data streams transmitted from at least first and second base stations to a mobile station, comprising the steps of:

(a) transmitting a first data stream from the first and second base stations to the mobile station, and transmitting a second data stream from the first base station to the mobile station;

(b) receiving, at the mobile station, the first data stream from the first base station and from the second base station, and receiving the second data stream from the first base station at the mobile station;

(c) forming a first stream of power control commands at the mobile station, wherein the first stream of power control commands is determined in accordance with the first data stream received from the first base station and the first data stream received from the second base station, and forming a second stream of power control commands at the mobile station, wherein the second stream of power control commands is determined in accordance with the second data stream received from the first base station;

(d) forming a power control signal at the mobile station from the first stream of power control commands and the second stream of power control commands;

(e) transmitting the power control signal from the mobile station to the first base station and the second base station;

(f) receiving the power control signal at the first base station and the second base station;

(g) forming a first received stream of power control commands at the first base station and a second received stream of power control commands from the received power control signal at the second base station; and (h) controlling a transmit power level of the first data stream from the first base station in accordance with the first received stream of power control commands, controlling a transmit power level of the second data stream from the first base station in accordance with the first received stream of power control commands, and controlling a transmit power level of the first data stream from the second base station in accordance with the second received stream of power control commands.

44. The method of claim 43, wherein the second received stream of power control commands corresponds substantially to the first stream of power control commands determined in step (c), and the first received stream of power control commands corresponds substantially to the second stream of power control commands determined in step (c).

45. The method of claim 43, wherein the first data stream is a voice message signal.

46. The method of claim 45, wherein the second data stream represents a fax transmission.

47. The method of claim 45, wherein the second data stream represents an internet transmission.

48. The method of claim 43, wherein the mobile station forms the first stream of power control commands in step (c) by monitoring an error rate associated with the first received data stream from the first base station and an error rate associated with the first received data stream from the second base station.

49. The method of claim 43, wherein the mobile station forms the first stream of power control commands in step (c) by monitoring an error rate associated with the first received data stream from the first base station and an error rate associated with the first received data stream from the second base station.

50. The method of claim 43, wherein the mobile station forms the first stream of power control commands in step (c) by monitoring a signal-to-noise ratio associated with the first received data stream from the first base station and a signal-to-noise ratio associated with the first received data stream from the second base station.

51. The method of claim 43, wherein each of the power control commands in the first stream of power control commands represents a command to either increase or decrease transmit power associated with the first data stream transmitted from the second base station in step (a).

52. The method of claim 51, wherein each of the power control commands in the second stream of power control commands represents a command to either increase or decrease transmit power associated with the first data stream transmitted from the first base station in step (a).

53. The method of claim 52, wherein each of the power control commands in the second stream of power control commands represents a command to either increase or decrease transmit power associated with the second data stream transmitted from the first base station in step (a).

54. The method of claim 43, wherein the first and second data streams are transmitted to the mobile station in step (a) on a common frequency band.

55. The method of claim 54, wherein the first and second data streams are transmitted to the mobile station using code division multiple access modulation.

56. The method of claim 43, wherein the mobile station is in a soft handoff between the first and second base stations while steps (a)–(h) are being performed.

57. In a mobile radio telephone communication system, a method for controlling transmit power levels of a first data stream transmitted to a mobile station from one or more base stations in a first active set of base stations and the transmit power levels of a second data stream transmitted from one or more base stations in a second set of active base stations to the mobile station, comprising the steps of:

(a) transmitting the first data stream from the first active set of base stations to the mobile station, and transmitting the second data stream from the second active set of base stations to the mobile station;

(b) receiving, at the mobile station, the first data stream from the first active set of base stations, and receiving the second data stream from the second active set of base stations at the mobile station;

(c) forming a first stream of power control commands at the mobile station, wherein the first stream of power control commands is determined in accordance with the first data stream received from each base station in the second active set of base stations and the second data stream received from each base station in the second active set of base stations, and forming a second stream of power control commands at the mobile station, wherein the second stream of power control commands is determined in accordance with the first data stream received from each base station in the first active set of base stations and not in the second set of active base stations;

(d) forming a power control signal at the mobile station from the first stream of power control commands and the second stream of power control commands;

(e) transmitting the power control signal from the mobile station to the first and second active sets of base stations;

(f) receiving the power control signal at a first base station, wherein the first base station is in the first active set and the second active set of base stations;

(g) forming a first received stream of power control commands at the first base station in accordance with the received power control signal, wherein the first received stream of power control commands corresponds to the first stream of power control commands formed at the mobile station;

(h) controlling a transmit power level of the first data stream from the first base station in accordance with the first received stream of power control commands, and controlling a transmit power level of the second data stream from the first base station in accordance with the first received stream of power control commands;

(j) receiving the power control signal at a second base station, wherein the second base station is in the first active set of base stations and not in the second active set of base stations;

(j) forming a second received stream of power control commands at the second base station in accordance with the received power control signal, wherein the second received stream of power control commands corresponds to the second stream of power control commands formed at the mobile station; and (k) controlling a transmit power level of the first data stream from the second base station in accordance with the second received stream of power control commands.

* * * * *